(12) United States Patent  
Penman et al.

(10) Patent No.: US 7,114,234 B2
(45) Date of Patent: Oct. 3, 2006

(54) CONDUCTOR TORQUING SYSTEM

(75) Inventors: Andrew Robert Penman, Lowestoft (GB); Peter John Lovegrove, Lowestoft (GB)

(73) Assignee: BJ Services Company, Houston, TX (US)

( * ) Notice: Subject to any disclaimer, the term of this patent is extended or adjusted under 35 U.S.C. 154(b) by 180 days.

(21) Appl. No.: 10/723,483

(22) Filed: Nov. 26, 2003

(65) Prior Publication Data

US 2004/0103515 A1    Jun. 3, 2004

Related U.S. Application Data

(63) Continuation-in-part of application No. 10/367,210, filed on Feb. 14, 2003.

(30) Foreign Application Priority Data

Mar. 18, 2002    (GB) .................................. 0206348

(51) Int. Cl.
  *B23P 19/00* (2006.01)
  *B23P 19/02* (2006.01)
  *B23P 19/04* (2006.01)
  *B23Q 3/00* (2006.01)

(52) U.S. Cl. .................... 29/426.5; 29/464; 29/235; 29/240

(58) Field of Classification Search ............... 29/428, 29/429, 426.5, 450, 235, 240, 282, 559, 38 A, 29/33 T, 33.39, 888, 407.02, 456, 464, 466; 81/57.16, 57.22, 58.24, 57.36, 467
See application file for complete search history.

(56) References Cited

U.S. PATENT DOCUMENTS 3,799,009 A    3/1974    Guier
3,902,385 A  *  9/1975    Haby .................... 81/57.34
4,023,449 A    5/1977    Boyadjieff ............. 81/57.16
4,603,464 A    8/1986    Smith, Jr. et al. ........ 29/428
4,694,712 A    9/1987    Doss .................... 81/57.17
4,895,056 A    1/1990    Schulze-Beckinghausen ..... 81/57.17
5,060,542 A   10/1991    Hauk ................... 81/57.34
5,150,638 A    9/1992    Penisson ............... 81/57.17
2004/0103515 A1 6/2004   Penman et al. .......... 29/426.5

FOREIGN PATENT DOCUMENTS

EP    0339005 B1    2/1993
GB    2230988       11/1990

(Continued)

OTHER PUBLICATIONS

International Search Report dated Jul. 29, 2003.
Photograph of chain tong.
Photograph of spinning conductor pipe with rope.

(Continued)

*Primary Examiner*—John C. Hong
(74) *Attorney, Agent, or Firm*—Howrey LLP

(57) ABSTRACT

A conductor torquing system is provided for large diameter threaded conductor casing which comprises a lower chain vise or fixed grip head adapted to grip a first joint of conductor casing, a plurality of movable arms operable to apply a retaining force to a second joint of conductor casing to maintain the latter in rotational contact with a spinning means. The spinning means is operable to rotationally make-up the second joint of conductor casing to the first joint of conductor casing to an initial make-up torque valve. The apparatus also includes an upper chain vise or rotary grip head for gripping the second joint of conductor casing and applying a final make-up torque to the threaded connection. The apparatus will allow a conductor connection to be made-up in a safe and efficient manner and generally assist in reaching the final torque stage more rapidly.

61 Claims, 17 Drawing Sheets

FOREIGN PATENT DOCUMENTS

| | | |
|---|---|---|
| GB | 2387186 A | 10/2003 |
| NL | 1022939 | 3/2003 |
| WO | WO 01/51763 A1 | 7/2001 |
| WO | WO 01/81047 A1 | 11/2001 |

OTHER PUBLICATIONS

Photograph of dual chain vises for breaking out horizontal conductor pipe.

International Search Report dated Mar. 9, 2004.

* cited by examiner

CONDUCTOR TORQUING SYSTEM

This application is a CIP of U.S. application Ser. No. 10/367,210, filed Feb. 14, 2003, the entire contents of which are incorporated herein, which claims the benefit of British Application No. GB 0206348.5, filed Mar. 18, 2002.

FIELD OF THE INVENTION

This invention relates to drilling equipment useful in the oil and gas industry. In particular, a system and method for making up or breaking out large diameter conductor casing or piles with threaded connectors in a vertical or horizontal mode are disclosed.

BACKGROUND OF THE INVENTION

Large diameter threaded conductor casings and piles are commonly used in drilling wells in the oil and gas industry, particularly for offshore wells. Typical conductor casing sizes used in the oil and gas industry range from 16 inches to 48 inches in diameter. Large diameter threaded tubulars are also used as pilings to secure offshore structures to the seafloor. These pilings may range from 16 inches to 48 inches and larger in diameter. These tubulars typically come in joints that are 30 to 40 feet in length with a threaded pin member on one end and a threaded box member on the other end.

Make-up of such large diameter threaded conductor casings typically requires rotating an upper joint so that its threaded pin member can screw into and make-up with the threaded box member of a stationary joint located in the rotary table. Currently, most conductor make-up service companies use rope to rotate or spin the upper joint of casing to partially make-up the connection. Two manual rig tongs are then connected to the two joints of conductor pipe, one above and one below the threaded connection, to torque the connection to the final make-up value. Other conductor make-up service companies may use a power tong to rotate or spin the upper joint of casing to make-up the connection. A separate manual tong is used on the bottom joint of casing to provide backup support to prevent the lower joint from rotating relative to the first joint of casing.

The current method of making up large diameter threaded connections is a hazardous process at best, involving several pieces of large, cumbersome equipment and several personnel working on the rig floor. There are safety hazards with the use of a rope for spinning pipe and in the handling and manipulation of both manual and powered tongs.

Thus, there is a need for a system and method of making up, or breaking out, large diameter threaded conductor casing which reduce the potential for injury to the operator and equipment and to create a more cost effective, efficient operation. The present invention is directed to a system and method which addresses this need for running large diameter threaded casings and/or piles. The invention also has application in the make-up or break-out of large diameter threaded tubulars in the horizontal mode, such as the laying of new pipeline.

SUMMARY OF THE INVENTION

In one embodiment of the invention, an apparatus for making up large diameter conductor casing having threaded connections is provided which comprises a lower chain vise adapted to grip a first joint of conductor casing to prevent rotation thereof, a plurality of moveable arms operable to apply a retaining force to a second joint of conductor casing to maintain a second joint of conductor casing in rotational contact with one or more drive wheels on a spinner means. The spinner means is operable to rotationally make-up a threaded connection for connecting the second joint of conductor casing to the first joint of conductor casing to an initial make-up torque. The apparatus also includes an upper chain vise adapted to grip the second joint of conductor casing and operable to apply a final make-up torque to the threaded connection connecting the second joint of conductor casing to the first joint of conductor casing. In one embodiment, the upper chain vise includes a pair of chains latchable together to grip the second joint of conductor casing, wherein the end of one of the chains is attached to a chain tensioner cylinder operable to tension the chains and the other end is attached to an anchor means. Similarly, the lower chain vise includes a pair of chains latchable together to grip the first joint of conductor casing wherein the end of one of the chains is attached to a chain tensioner cylinder that is operable to tension the chains and the other end is attached to an anchor means. A wrenching cylinder may connect the upper and lower chain vises wherein operation of the wrenching cylinder transmits the final makeup torque to the upper chain vise. The upper chain vise and lower chain vise may include one or more die blocks for gripping the conductor casing. A drive arm cylinder may be used to actuate the movable arms. Preferably, the chain tensioner, wrenching, and drive arm cylinders, is as well as the drive unit for the drive wheels, are hydraulically actuated. Another embodiment of the apparatus includes pivotable support arms for supporting the pair of chains for the upper chain vise, wherein the support arms are movable between a first position where the chains may be latched together and a second position where the chains may be released from the second joint of conductor casing. Similarly, the pair of chains for the lower chain vise may be supported by pivotable support arms, wherein the support arms are moveable between a first position where the chains may be latched together and a second position where the chains are released from the first joint of conductor casing. The apparatus may have one or more movable arms operable to apply a retaining force to the second joint of pipe to maintain the second joint of pipe in rotational contact with the drive wheels of the spinner means.

Another embodiment of the invention is directed to an apparatus for making up jointed pipe with threaded connections comprising a first chain vise adapted to grip a first joint of pipe to prevent rotation thereof, a spinner means having one or more drive wheels operable to rotationally make-up a threaded connection for connecting a second joint of pipe to the first joint of pipe to an initial make-up torque, and a second chain vise adapted to grip the second joint of pipe and operable to apply a final make-up torque to the threaded connection. The lower and upper chain vises may each include a pair of chains latchable together to grip the first and second joints of pipe respectively. Pivotable support arms for supporting the respective pair of chains may also be included wherein the support arms are movable between a first position where the chains may be latched together and a second position wherein the chains are released from the first joint and second joint of pipe, respectively.

An additional embodiment involves the use of high tensile webbing straps instead of chains to form "grip heads" as opposed to "chain vises." A grip head utilizes two webbing straps made of materials that are able to withstand an upper torque range of about 150,000 ft. pounds. An upper grip head, also known as the rotary grip head, and the lower grip head, also known as the fixed grip head, may be present on the apparatus. Each grip head may contain two arms that wrap around the casing. In one particular embodiment, the rotary grip head includes a pair of straps latchable to a grip head housing and used to grip the second joint of conductor casing. One end of the strap is attached to a strap tensioner cylinder and the other to the fixed strap adjustment assembly.

According to another embodiment of the invention, a method for making up large diameter conductor casing having threaded connections is provided which includes the steps of gripping a first joint of conductor casing with a lower chain vise to prevent rotation thereof, applying a retaining force to a second joint of conductor casing with one or more arms to maintain the second joint of conductor casing in rotational contact with one or more drive wheels on a spinner means, making up a threaded connection connecting the second joint of conductor casing to the first joint of conductor casing to an initial make-up torque with the spinner means and applying a final make-up torque to the threaded connection connecting the second joint of conductor casing to the first joint of conductor casing with an upper chain vise.

According to another embodiment of the invention, a method for breaking out jointed pipe having threaded connections is disclosed. The method comprises the steps of gripping a first joint of pipe with a lower chain vise to prevent rotation thereof, applying a retaining force to a second joint of pipe with one or more arms to maintain the second joint of pipe in contact with one or more drive wheels on a spinner means, applying a breakout torque to the threaded connection connecting the second joint of pipe to the first joint of pipe with an upper chain vise, and breaking out the threaded connection with the spinner means until the second joint of pipe is disconnected from the first joint of pipe, wherein the lower chain vise, the upper chain vise, the one or more arms and the spinner means are components of a single apparatus.

Another embodiment of the invention involves a method for making up large diameter conductor casing having threaded connections is provided which includes the steps of gripping a first joint of conductor casing with a fixed grip head to prevent rotation thereof, applying a retaining force to a second joint of conductor casing with one or more arms to maintain the second joint of conductor casing in rotational contact with one or more drive wheels on a spinner means, making up a threaded connection connecting the second joint of conductor casing to the first joint of conductor casing to an initial make-up torque with the spinner means and applying a final make-up torque to the threaded connection connecting the second joint of conductor casing to the first joint of conductor casing with a rotary grip head. As similar method for breaking out jointed pipe may be accomplished by the present invention.

According to an additional embodiment of the present invention, a method for making up jointed pipe having threaded connections is disclosed. The first joint of pipe is gripped by a gripping means to prevent rotation. A second joint of pipe is retained against one or more drive wheels on a spinner means. The threaded connection between the first joint and second joint of pipe is made-up to an initial torque using the spinner means. A final torque to the threaded connection is applied by a gripping means on the second joint of pipe.

An additional embodiment of the present invention involves an automated apparatus for making up and breaking out jointed pipe. The apparatus comprises a rotary grip head, a fixed grip head, arms, and a spinner means. As the apparatus is moved into position around the pipe, the arms are retracted around the casing, thereby placing webbing in contact with the casing. The webbing is attached to the outer and inner arm latches, which come together around the pipe and are held in place by a latch pin. After tensioning the webbing, the spinner means is used to apply torque to the pipe. After final torque is applied to the pipe using the rotary grip head, the webbing tension is released, the latch pin is removed, and the arms swing open allowing the apparatus to be moved away from the pipe.

BRIEF DESCRIPTION OF THE DRAWINGS

The following figures form part of the present specification and are included to further demonstrate certain aspects of the present invention. The invention may be better understood by reference to one or more of these figures in combination with the detailed description of the specific embodiments presented herein.

DESCRIPTION OF ILLUSTRATIVE EMBODIMENTS

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
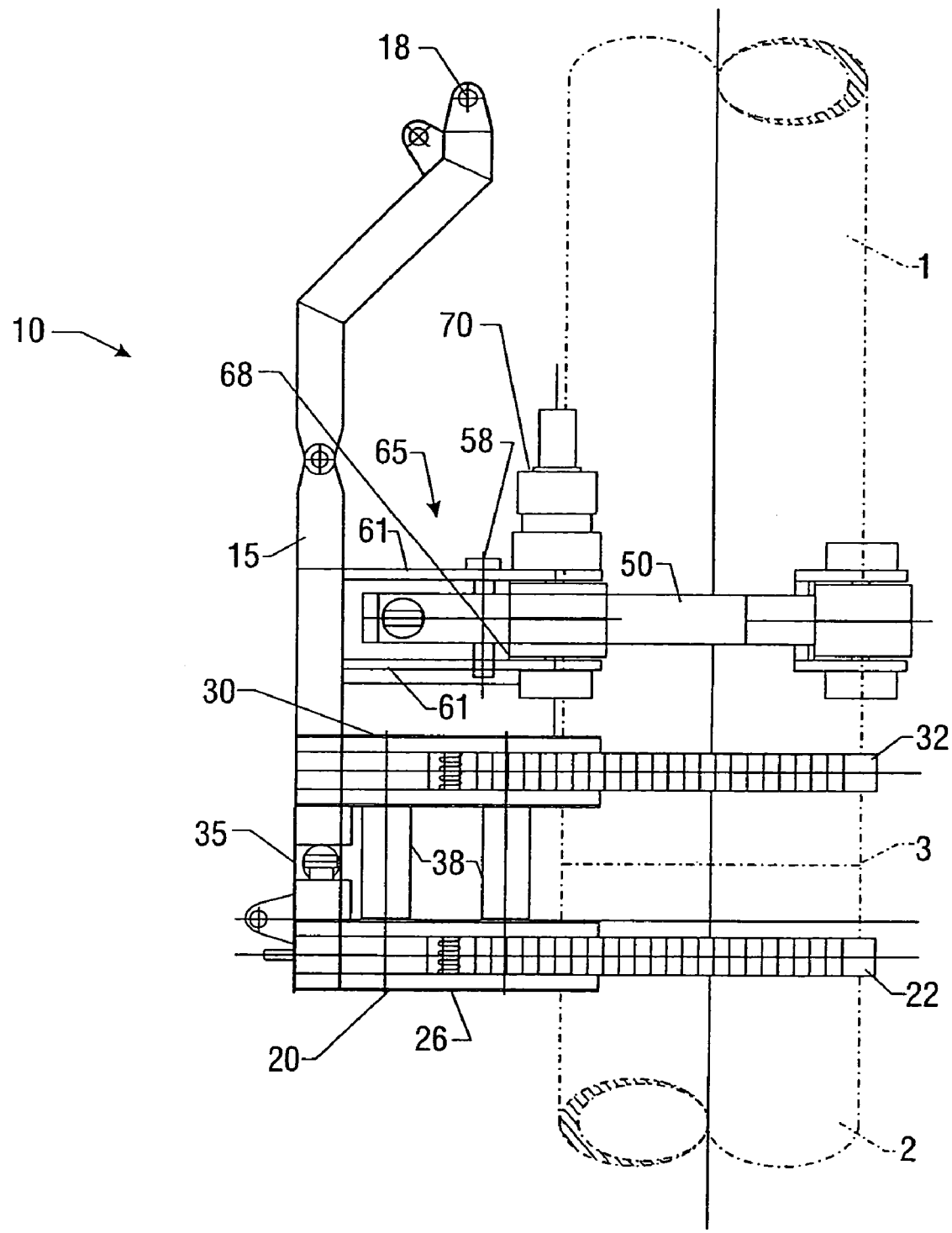
FIG. 1 is a side view of the conductor torquing apparatus according to one embodiment of the present invention.

Referring to FIG. 1, the conductor torquing apparatus of the present invention is shown making up a large diameter threaded conductor casing. More particularly, conductor torquing apparatus 10 is making up an upper conductor casing joint 1 to a lower conductor casing joint 2. The upper and lower joints of conductor casing are connected by a conventional large diameter threaded connection 3, typically including a threaded pin member (not shown) on the bottom of upper joint 1 which will stab into and make-up with a box member (not shown) on lower conductor casing joint 2 having mating threads. Traditional sizes for large diameter conductor pipe used in the offshore energy industry include 16", 18⅝", 20", 24", 26", 30", 36", 42" and 48" diameters. Although the present invention is particularly suited to make-up or break-out such traditional large diameter threaded conductor casings, one of skill in the art will appreciate that the invention could be modified to handle smaller diameter threaded tubulars as well.

The conductor torquing apparatus 10 includes a support frame 15 with eyelet 18 on its uppermost end. Apparatus 10 may be suspended from the derrick or from a commercially available automated mechanism for maneuvering power tongs to and from the well center line during casing running operations, such as BJ Tubular Services' Leadhand MKII. Cables and/or chains for suspending the conductor torquing apparatus from the derrick or automated mechanized system may be attached to eyelet 18.

Figure 2:
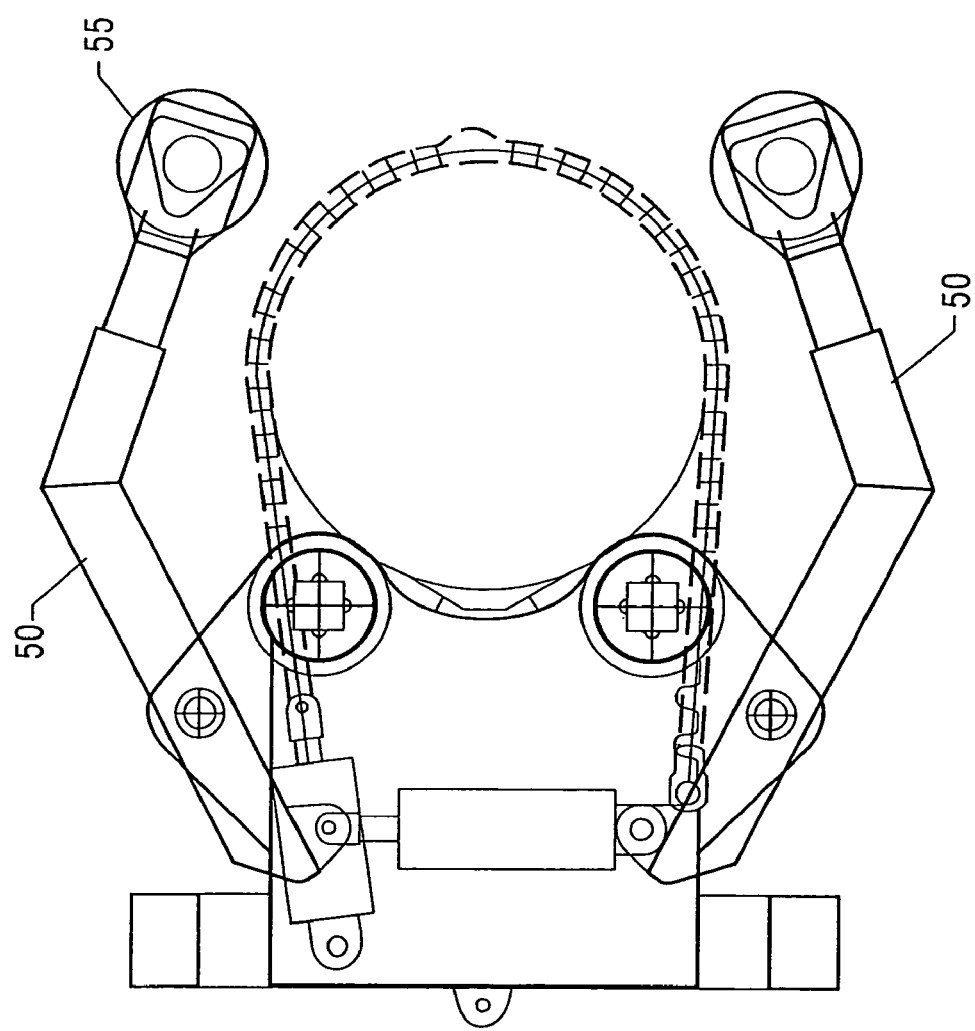
FIG. 2 is a sectional plan view showing the conductor torquing apparatus with the retaining arms in the open position.
Figure 4:
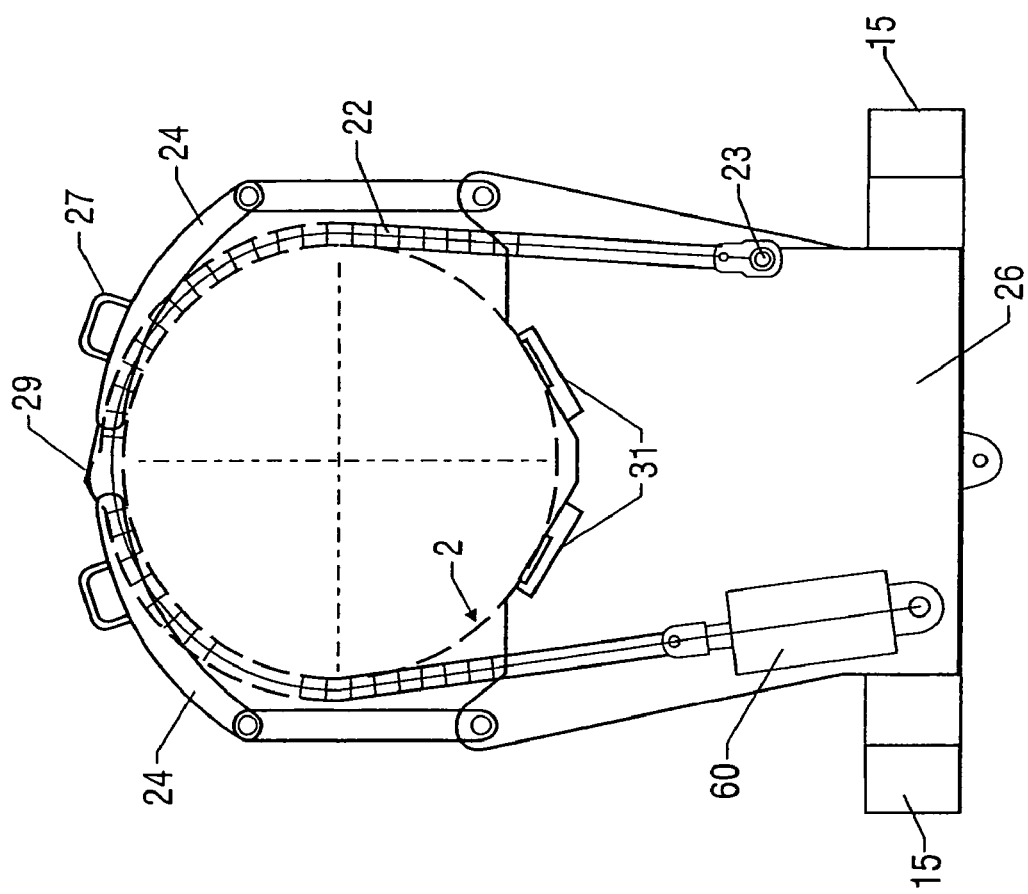
FIG. 4 is a sectional plan view illustrating a chain vise with support arms.
Figure 5:
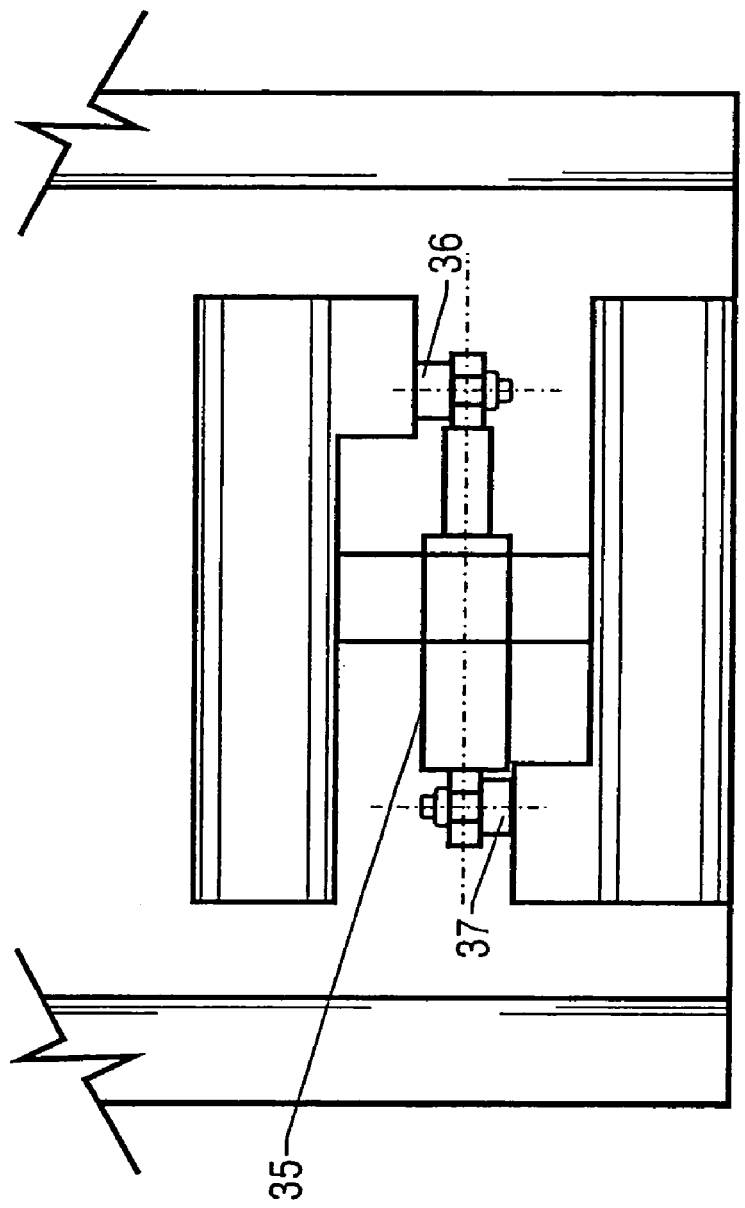
FIG. 5 is an end view of the upper and lower chain vises and wrenching cylinder.

Attached to the lower end of support frame 15 is lower chain vise 20 which is adapted to grip the upper portion of lower conductor casing 2 that extends from the rotary table. Lower chain vise 20 includes chain 22 which wraps around, and ultimately grips, the lower conductor casing. Chain 22 may consist of two separate lengths which have a latching device 29 to connect the two lengths of the chain about the conductor casing. Alternatively, a full wrap of chain may extend substantially around the conductor casing and attaches using any conventional latching device, such as a "cocks comb" or removable pin. Such latching devices are well known in the art. Lower chain vise 20 may also include chain tensioner cylinder 60 which is attached to one end of chain 22 as shown in FIGS. 2 and 4. The other end of chain 22 may be secured by any suitable anchor means such as pin 23. To facilitate handling of chain 22, chain vise 20 may include support arms 24, which may be pivotably attached to horizontal support member 26. Handles 27 may be used to open, connect and disconnect chain 22 about casing 2.

Chain tension cylinder 60, when actuated, will apply sufficient tension on chain 22 to prevent lower conductor casing 2 from rotating. Chain vise 20 may include one or more die blocks 31 for applying an additional gripping force on casing 2 when chain 22 is tensioned. Die blocks 31 are similar to conventional tong dies and include teeth for biting into the casing. Once chain 22 is fully tensioned, lower chain vise 20 serves as an anchor for apparatus 10. Lower chain vise 20 also provides backup support to prevent lower conductor casing 2 from rotating during the rotational make-up of upper conductor casing 1 to the lower conductor casing.

Upper chain vise 30 is spaced vertically above lower chain vise 20 as shown in FIG. 1. Upper chain vise 30 is adapted to grip the upper conductor casing 1 and is operable to apply a final make-up torque to the threaded connection 3 as described in more detail below. Upper chain vise 30 is similar in construction and operation to lower chain vise 20 with chain 32 being of sufficient length to extend around the upper conductor casing. Chain 32 attaches to a separate chain tensioner cylinder 60 on one end and to an anchor means, such as pin 23, on the other end. Chain tensioner cylinders 60 are preferably hydraulically actuated, although the apparatus could be actuated by electromechanical or pneumatic means. Chain 32 may be latched in a similar fashion as chain 22, such as by a latching device similar to latching device 29. Upper chain vise 30 may also include one or more die blocks, similar to die blocks 31, to further grip upper conductor casing 1 when final makeup is applied by the upper chain vise. The die blocks may be positioned about the horizontal support members (member 26 and a comparable member on the upper chain vise) to grip a range of pipe diameters. By way of example, the die blocks may be positioned to grip conductor casings ranging from 16" to 48".

Supports 38 provide additional vertical supports and spacing between upper chain vise 30 and lower chain vise 20. The supports 38 needs to be of sufficient length to ensure that upper chain vise 30 will grip the upper conductor casing joint after lower chain vise 20 has gripped the lower conductor casing joint. The threaded connectors may have upset box and pin members which have a greater outer diameter than the conductor casing itself. The upper and lower chain vises for conductor torquing apparatus 10 can easily accommodate the larger diameter box and pin members. Thus, it shall be understood that references to gripping the upper or lower conductor casing joints with the chain vise is meant to include the gripping of the box and/or pin members of the threaded connector as well.

A spinning means is attached to support frame 15 above the upper chain vise 30. Spinning means 65 may include one or more drive wheels 68, and a spinning section drive gear unit 70 for each drive wheel. In another preferred embodiment, spinning means 65 also includes retaining arms 50 and arm drive cylinder 65. Referring to FIG. 2, movable retaining arms 50 are shown in the open position about the upper conductor casing joint. Retaining arms 50 may be telescopic in nature to provide for greater extension and/or to accommodate a wider range of conductor casing sizes. Arms 50 may also include retaining rollers 55 attached to their distal ends. Retaining arms 50 are attached to horizontal support frame 61 by pivot pins 58. Horizontal support frame 61 extends from support frame 15 and may be part of spinning means 65. The proximal end of arms 50 is connected to drive cylinder 65 by any suitable connector such as pins 53. Drive cylinder 65 may be positioned between the upper and lower plates of horizontal support frame 61. Actuation of drive cylinder 65 will cause arms 50 to pivot about pivot pins 58, thereby opening or closing arms 50 about a joint of conductor casing. Drive cylinder 65 is illustrated in the extended position in FIG. 3, wherein arms 50 are closed about the upper conductor casing joint. Drive cylinder 65 is illustrated in the retracted position in FIG. 2 wherein arms 50 are moved to the open position.

Figure 3:
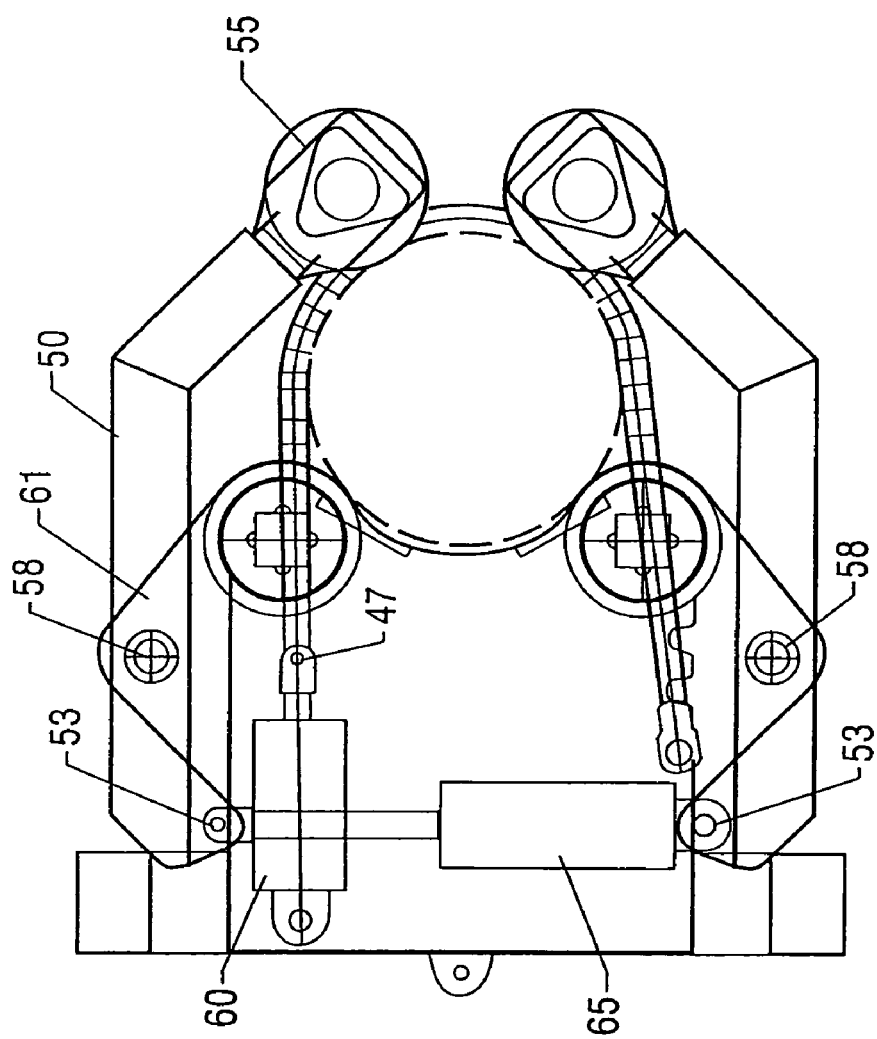
FIG. 3 is a sectional plan view showing the apparatus of FIG. 2 making up a smaller diameter conductor casing with the retaining arms in the closed position.

In the closed position, arms 50 apply a retaining force to the upper joint of conductor casing to maintain the joint in rotational contact with drive wheels 68. Although the embodiments shown in FIGS. 2 and 3 illustrate a pair of movable arms, one of skill will appreciate that a single arm could be used so long as it applies a retaining force to the upper joint of casing to maintain the joint in contact with drive wheels 68.

In one embodiment, drive wheels 68 have a polyurethane coating to maintain a friction contact with the upper conductor casing joint during the initial rotational make-up of the threaded connector 3. Alternatively, other suitable rubber materials may coat the drive wheels. The drive wheels are driven by hydraulic motor gear box 70 which may be attached to horizontal support frame 61. Retaining rollers 55 facilitate the rotation of upper conductor casing joint 1. In a preferred embodiment, the spinning means includes two drive wheels that are fixed in place but are capable of maintaining frictional contact with a wide variety of different size conductor pipe. In a preferred embodiment, the conductor torquing apparatus may make-up or break-out conductor pipe ranging from 16 inches up to 48 inches. As shown in FIGS. 2 and 3, horizontal support frame 61 may have a V-shape to facilitate the handling of different size conductor casings. The spinner means is used to rotate the upper joint of conductor pipe up to an initial make-up torque value, for example, up to about 5000 foot pounds. The initial make-up torque may range from stab-in to either shoulder engagement or achievement of taper thread interference, depending upon the size, type and make of the threaded connector. In the initial make-up position, threaded connector 3 will typically be within 15 degrees from a final make-up position.

Once the spinner means has applied the initial make-up torque to the connection, the upper chain vise 30 is used to apply the final make-up torque to the connection. Chain 32 is tightened around the upper conductor casing joint by activating the chain tensioner cylinder 60 for the upper chain vise. Once the upper chain vise has gripped the upper conductor joint, wrenching cylinder 35 is actuated to apply the final make-up torque to the connection. Wrenching cylinder 35 extends horizontally between the upper and lower chain vises. A vertical boss 36 extends upwardly from the lower chain vise and attaches to one end of wrenching cylinder 35. A downwardly extending boss 37 connects upper chain vise 30 to wrenching cylinder 35. The bosses 36 and 37 are structurally mounted to transmit the load to each of the chain vises. To apply the final make-up, wrenching cylinder 35 is retracted which causes chain 32 and upper conductor casing 1 to rotate clockwise relative to lower chain vise 20 and lower casing conductor joint 2. The rotation of chain 32 relative to lower chain vise 20 applies the necessary torque across the threaded connection to reach the final make-up torque and position. In one embodiment, the conductor torquing apparatus may be used to apply a final make-up torque ranging from the initial make-up torque to about a 120,000 foot pounds. However, it should be understood that the final make-up torque may vary depending upon the size, type and make of the threaded connector.

In a preferred embodiment, the conductor torquing apparatus is hydraulically operated. More particularly, chain tensioner cylinders 60, arm drive cylinder 65, wrenching cylinder 35 and spinning means drive gear units 70 are hydraulically actuated. However, one of skill in the art will appreciate that the apparatus could also be electromechanically or pneumatically actuated. The apparatus may be operated by a remote control console, thereby reducing the number of personnel on the rig floor. In a preferred embodiment, a hydraulically actuated remote control unit is connected to apparatus 10 and powered by any suitable commercial hydraulic power unit. It is contemplated that a single operator could operate the conductor torquing apparatus from the remote control unit located a sufficient distance away from the tubular make-up area thereby reducing the potential for injury to the operator. In addition to being substantially safer than conventional methods and apparatus for making-up and running (or breaking out and retrieving) large diameter conductor casing, the present invention also is a more cost effective and efficient way of making-up and running (or breaking-out and retrieving) such conductor casing.

Figure 8:
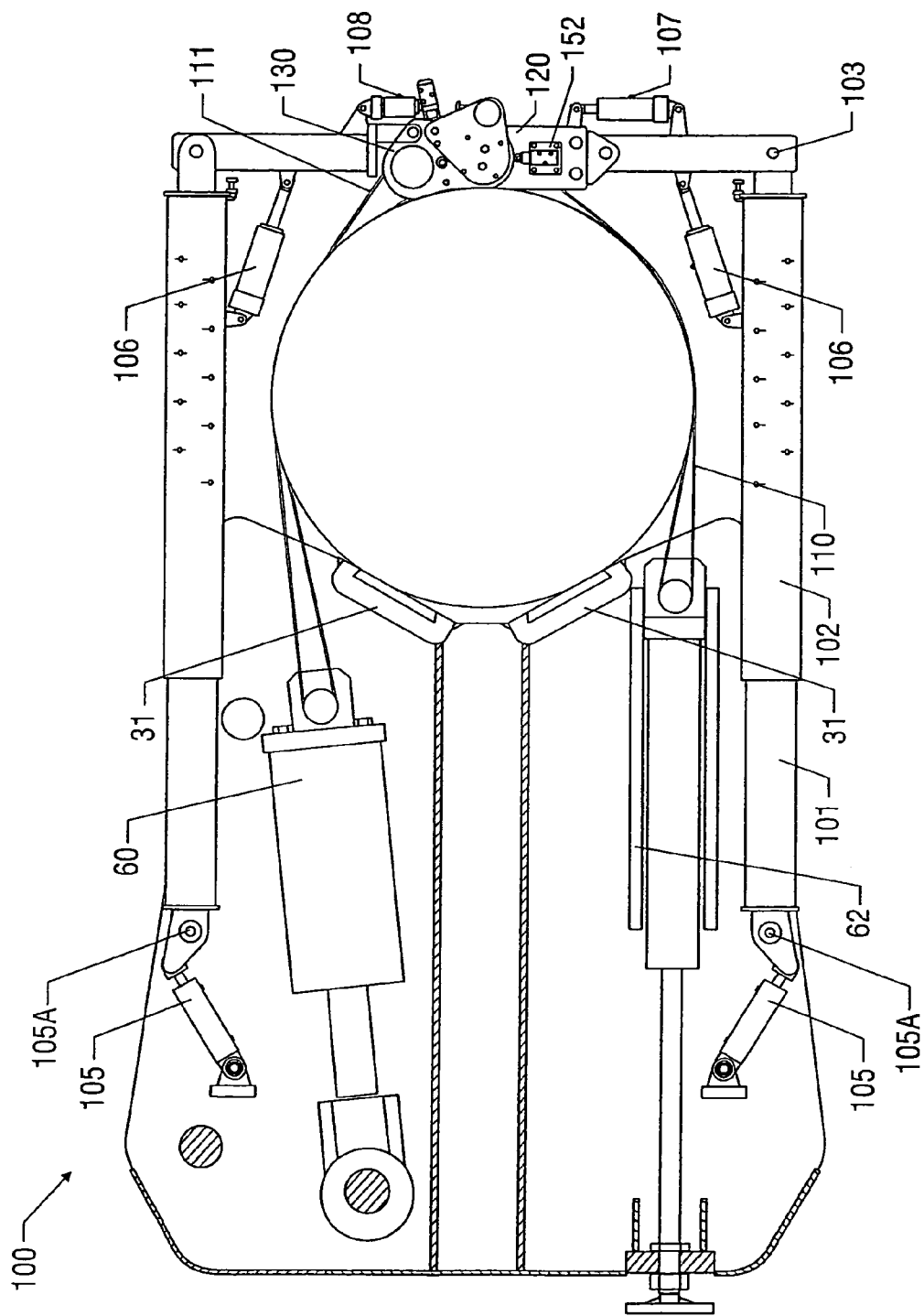
FIG. 8 is a sectional view of the fixed grip head with the arms in a closed position.
Figure 9:
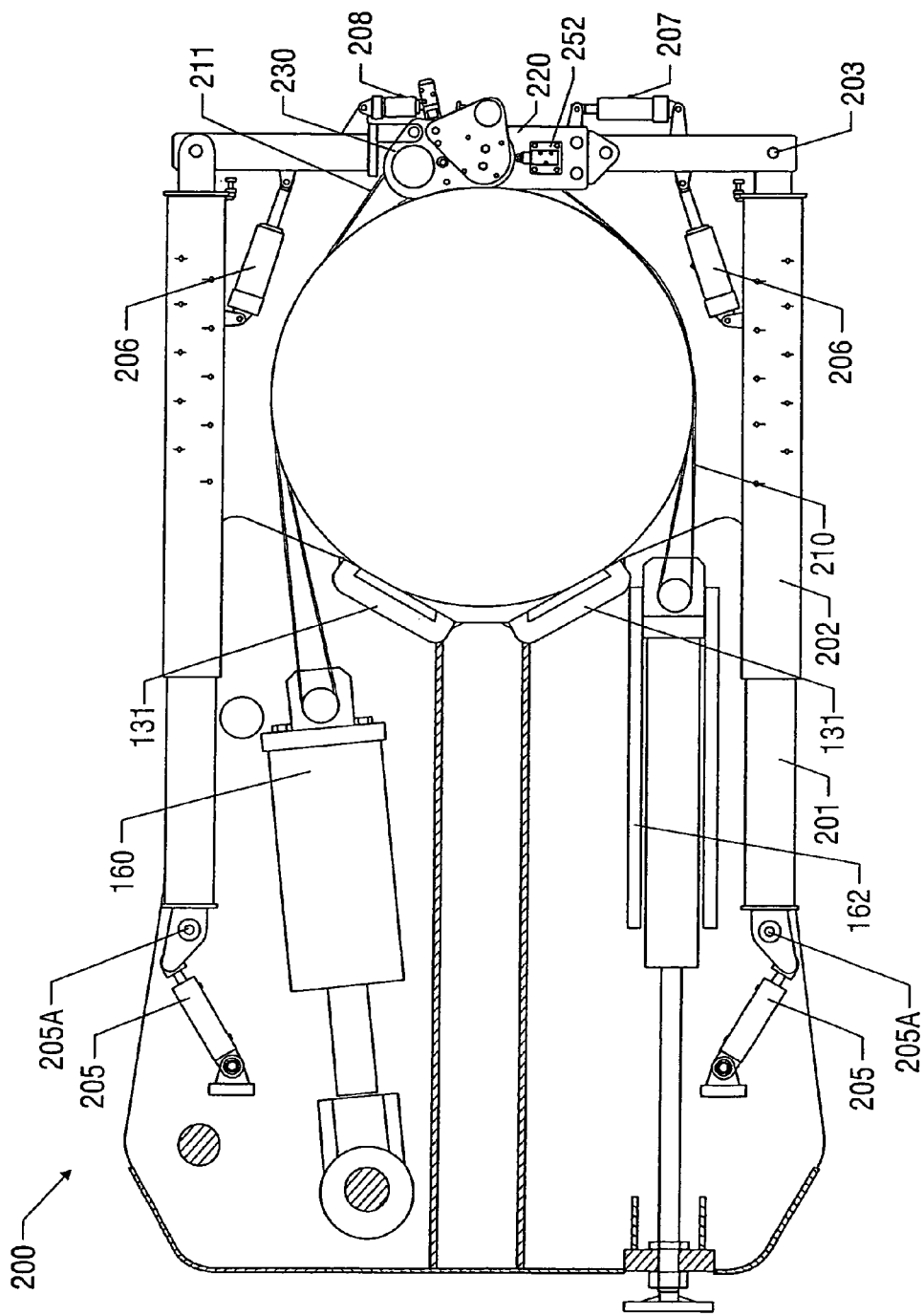
FIG. 9 is a sectional view of the rotary grip head with the arms in a closed position.
Figure 10:
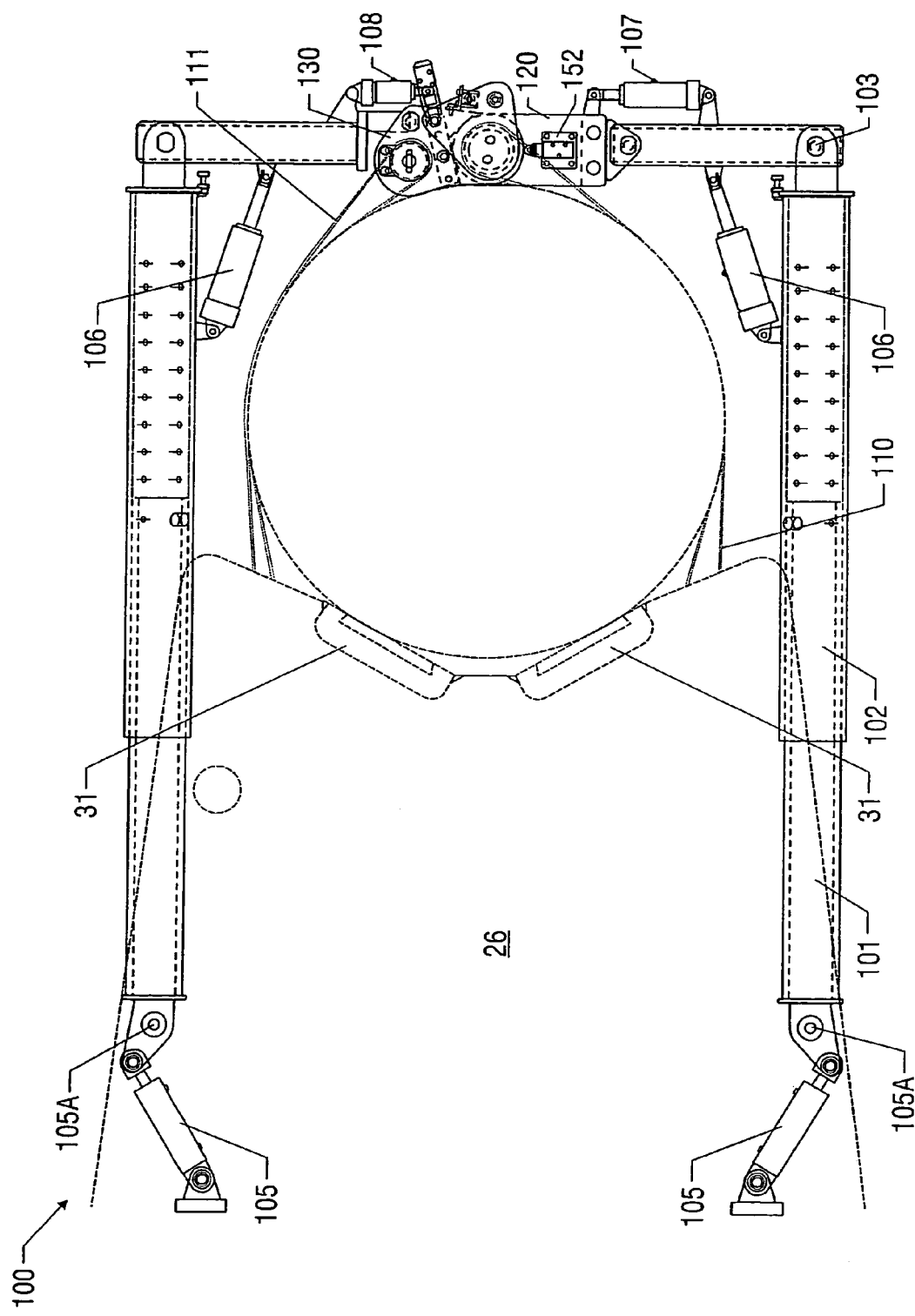
FIG. 10 is a section view of the fixed grip head with a cover plate in position.
Figure 12:
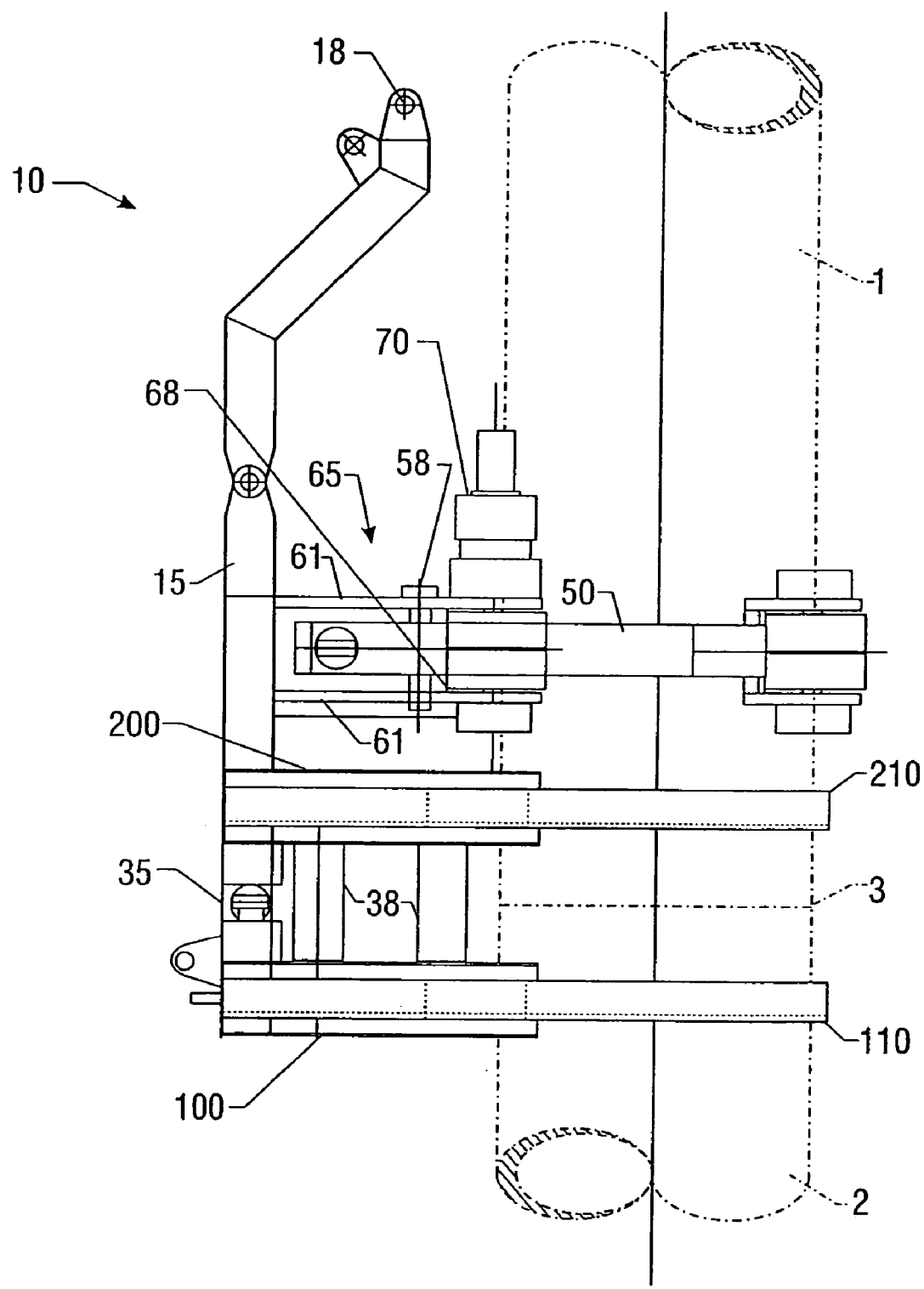
FIG. 12 is a side view of the conductor torquing apparatus according to one embodiment of the present invention.
Figure 13A:
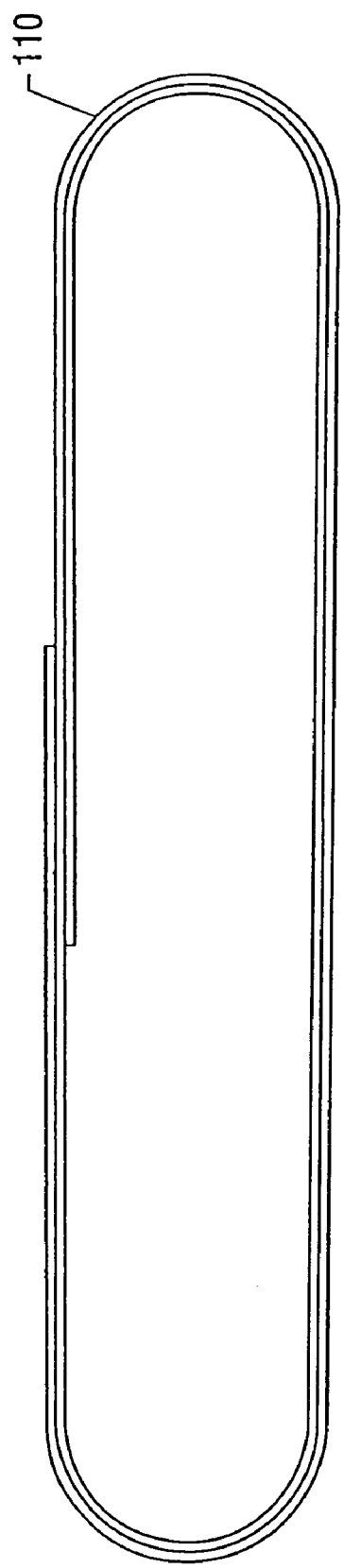
FIG. 13A is an overhead view of the webbing straps.
Figure 13B:
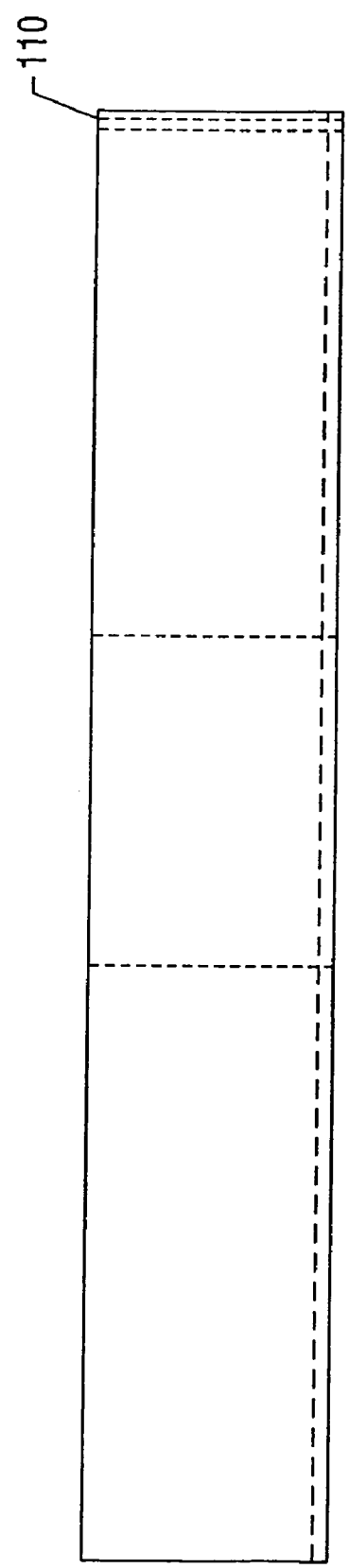
FIG. 13B is a side view of the webbing straps.

In another embodiment, illustrated in FIGS. 8 and 12, a lower head grip, also known as a fixed head grip 100 is attached to support 15 and is adapted to grip the upper portion of lower conductor casing 2 that extends from the rotary table. Fixed head grip 100 includes two high tensile webbing straps 110 and 111 which wrap around, and ultimately grip the lower conductor casing. The fixed head grip also includes a latching mechanism that connects the straps so that the straps may be tensioned to grip the casing. Inner latch arm strap 110 may consist of one continuous loop of webbing, wherein the ends are joined together by stitching as shown in FIGS. 13A and 13B to form several loops that create layers of desired thickness. Perimeter bond stitching may also be utilized to secure the loops of webbing together. Outer latch arm strap 111 may be made in a similar manner. As shown in FIG. 9, one end of each strap 110, 111 may each be secured to a strap tensioner cylinder 60, or a hand adjustment cylinder 62, while the other end is attached to the inner 120 or outer 130 latch respectively. It is also possible for one end of one strap to be attached to an anchor point, while the other end is attached to the outer latch 130 or inner latch 120. It is also possible to attach one end of webbing strap 110 to a strap tensioner cylinder 60, and strap 111 to another strap tensioner cylinder 60, while the other ends are attached to the inner 120 and outer 130 latch respectively. The strap tensioner cylinder 60 is typically operated by hydraulics, and the hand adjustment cylinder 62 may be used to adjust the anchor point for the webbing so that it may be used with different casing sizes. An upper head grip, otherwise known as a rotary head grip 200, is attached around an upper conductor joint and has similar components.

The high tensile webbing straps as shown in FIGS. 13A and 13B preferably are made out of a material containing Kevlar, but other high tensile materials that will withstand a torque of up to 150,000 ft. pounds may be used. In a preferred embodiment, a typical width for the strap is about 8 inches and a typical thickness for the strap is about ¼ (quarter) inch. Once the strap is stitched into a continuous loop, as depicted in FIG. 13A, the overall thickness in a preferred embodiment is approximately 6 inches. Only a few different sizes of loops are needed because of the fixed strap adjustment assembly 62, the length of which may be adjusted to accommodate different diameter conductor casing for a given length of strap. By way of example the hand wheel on adjustment cylinder 62 may be turned to shorten or lengthen the telescopic arm of the cylinder. In a preferred embodiment, only three strap loop sizes are necessary to handle casing sizes that range from about 18⅝" to about 24", about 26" to about 32", and about 34" to about 37". All casing sizes in between may be gripped by adjusting one of the above straps with the hand adjustment cylinder 62.

Figure 11:
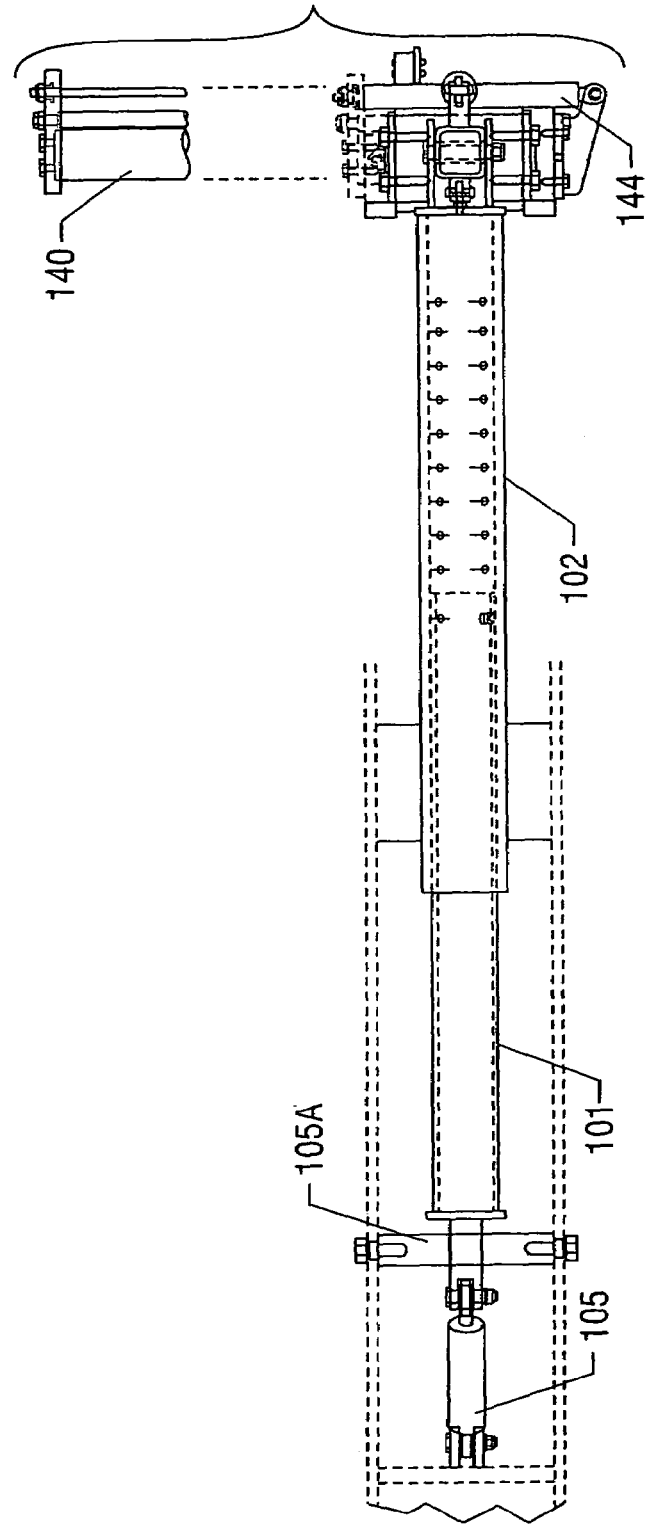
FIG. 11 is a side view of the inner latch arm and latch mechanism showing the installation of the latch pin.

As shown in FIGS. 8 and 11, two arms that may be attached to the support 15 (not shown) by hydraulic cylinders 105 provide support for the webbing straps 110,111 when they are not engaging the casing. Actuation of cylinders 105 will cause the arms to pivot about pin 105A, thereby allowing the arms to open or close about the conductor casing. Each arm may be made up of an inner arm 101 and an outer arm 102, with the inner arm sliding longitudinally within the outer arm allowing adjustment for different casing sizes. At the end of one arm is an inner latch assembly 120, and at the end of the other arm is an outer latch assembly 130, attached such that the latch assemblies may pivot into position around the conductor casing 2. A spring tension cylinder 106 may also be attached between each arm and the latch assembly. This spring tension cylinder 106 causes the inner and outer latch assemblies to pivot out of the way when the head grip assembly 100 is being maneuvered around the conductor casing 2. Once the inner latch 120 and outer latch 130 assemblies come together, a latch pin 140 secures them such that when the straps 110, 111 are tensioned, the conductor casing is securely held in place. Die blocks 31 may be included in support plate 26 to provide an additional gripping force on conductor casing 2 to keep the casing from rotating during make-up of threaded connector 3. The rotary grip head 200 grips the upper casing joint in substantially the same way as the fixed grip head grips the lower casing joint.

An additional embodiment of the present invention involves an automated apparatus for making up and breaking out jointed pipe. As shown if FIGS. 7, 8, 9 and 12, the apparatus 10 comprises a fixed grip head 100, a rotary grip head 200, and a spinner means 65. Once an upper joint of casing 1 has been stabbed into the box end of the lower joint 2 in the rotary table, the apparatus 10 is moved into position around the conductor pipe. Arms 101,102 are positioned around the lower casing conductor 2, thereby placing webbing 110,111 in contact with the outer diameter of the casing. The webbing 110,111 is attached to the inner arm 120 and outer arm 130 latches, which come together around the casing. Inner latch hydraulic cylinder 107 and outer latch hydraulic cylinder 108 move the inner 120 and outer 130 latches into a closed position. After switch 152 indicates that the latches are properly aligned and together, a latch pin 140 is dropped into place by hydraulic latch cylinder 144 to secure the inner 120 and outer 130 latches in a closed position. The latch pin triggers switches 143 and 150. Switches 143 and 150 may be cam operated valve switches or electric micro-switches. Switch 150 indicates that the pin has been installed and that the webbing is ready to be tensioned. Hydraulic cylinder 60 is actuated to tension strap 111, and via inner and outer latches 120 and 130, strap 110. Once tensioned, fixed grip head 100 prevents lower casing conductor 2 from rotating.

After tensioning the webbing 110,111, the spinner means 50 is used to rotate the joint upper conductor to an initial make-up position as described in the previous embodiment. Arms 201 and 202 of the rotary grip head 200 are then moved into position around the upper joint 1. The webbing 210,211 attached to the outer 230 and inner 220 arm latches comes together around upper joint 1. The inner latch hydraulic cylinders 207 and the outer latch hydraulic cylinders 208 move the inner 220 and outer 230 latches together into a closed position. After switch 252 indicates that the latches are properly aligned and together, a latch pin 240 is dropped into place by a hydraulic latch cylinder to secure the inner 220 and outer 230 latches in a closed position. The latch pin 240 triggers position switches 243 and 250. Switch 250 indicates that the pin has been installed and that the webbing is ready to be tensioned. Latch pin 240 and switches 243 and 250 are not illustrated but are similar to latch pin 140 and switches 143 and 150.

After tensioning the webbing 210,211 using the tensioning cylinder 160, final torque is applied to the pipe 1 by actuating a wrenching cylinder 35 as described above. Actuation of the wrenching cylinder causes straps 210 and 211 and upper conductor casing 1 to rotate clockwise relative to lower straps 110 and 111 and lower casing conductor joint 2. After final torque has been applied (and the wrenching cylinder is returned to its original position), the webbing tension is released using the tensioning cylinder 160, and the latch pin 240 is removed. Switch 243 indicates that the pin has been fully removed and actuation of inner latch cylinder 207 and outer latch cylinder 208 disconnect the inner and outer latches. Once the inner and outer latches, 220 and 230 respectively, are released, hydraulic cylinders 205 are retracted to swing arms 220 and 230 open. Similarly, after releasing tension on webbing straps 110, 111 using tensioning cylinder 60, latch pin 140 is removed by stroking latching cylinder 144 to its extended position. Switch 143 indicates that the pin has been fully removed, and latch cylinders 107 and 108 release the inner and outer latches 120 and 130. Hydraulic cylinders 105 are actuated to open arms 120 and 130. Spinner arms 50 are also moved away from the casing, allowing the apparatus 10 to be moved away from the completed connection 3.

Figure 14:
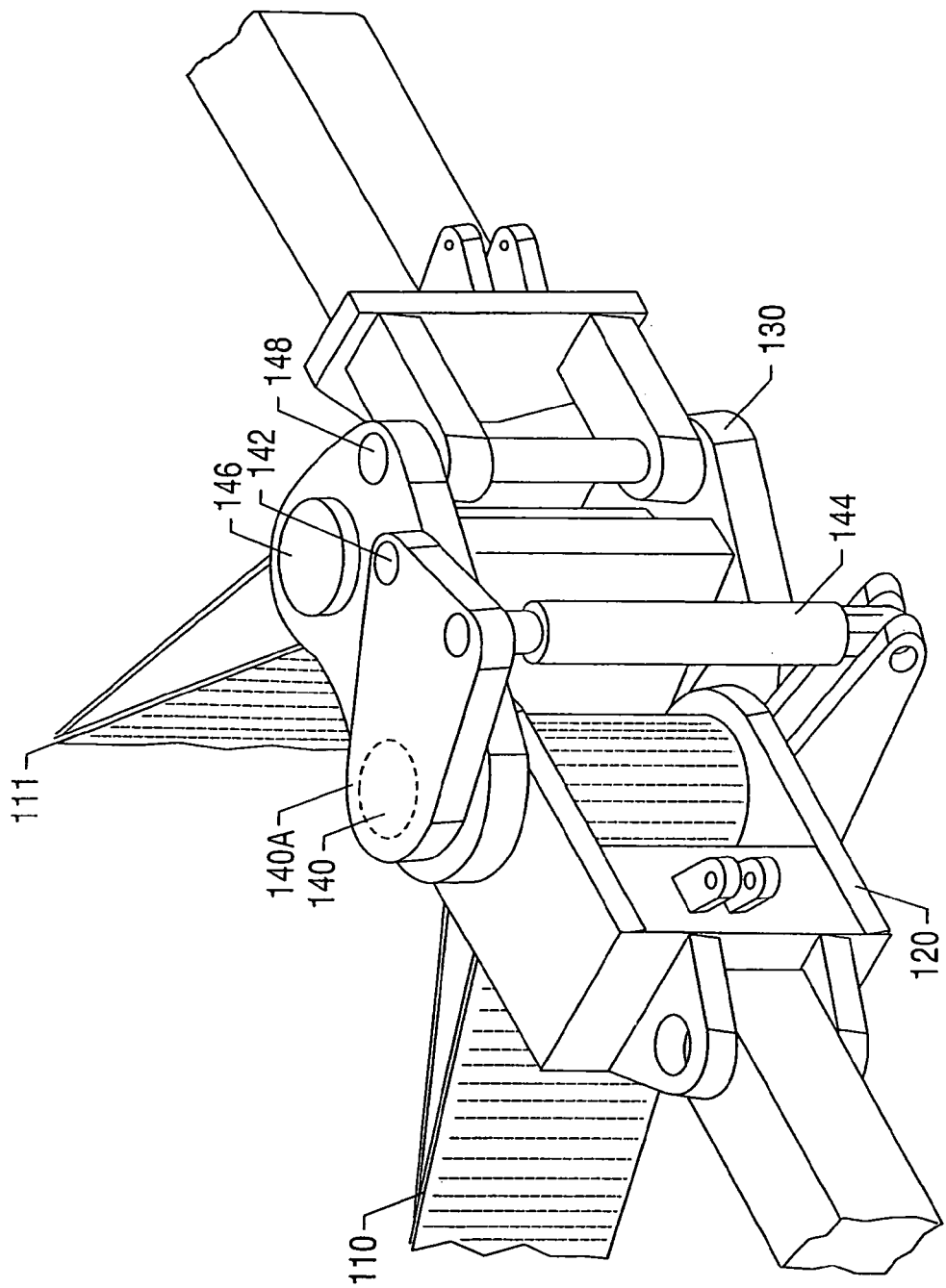
FIG. 14 is a simplified view of the latching mechanism.
Figure 15:
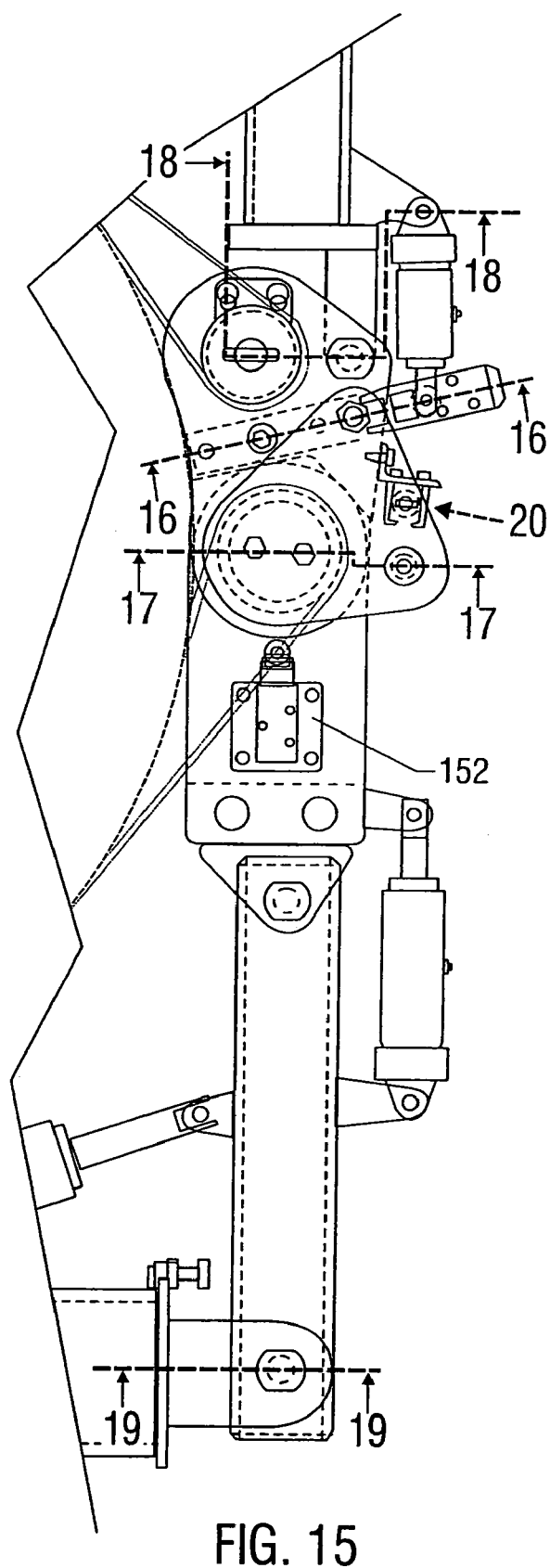
FIG. 15 is an overview of the cross-sections of the latching mechanism.

A simplified version of a preferred embodiment of the latch mechanism of the fixed grip head is shown in FIG. 14. Outer latch arm webbing 111 is attached to the outer latch 130 via an outer latch strap pin 146. The outer latch 130 is pivotably attached to the outer latch arm using an outer latch arm pin 148. The other latch 130 also comprises a slot for a latch cylinder guide rod 142 to accommodate the latch pin 140. A latch cylinder 144 is also attached to the outer latch 130 and operable to move the latch pin 140 between a latched and unlatched position. The inner latch arm webbing 110 is attached to the inner latch 120 on a hollow cylinder 120A such that the latch pin 140 is dropped into the cylinder when securing the inner latch 120 and outer latch 130 together. FIG. 15 shows an overview of the latch mechanism cross-sections further detailed in FIGS. 16–20. The latch mechanism for the rotary grip head is substantially the same.

Figure 16:
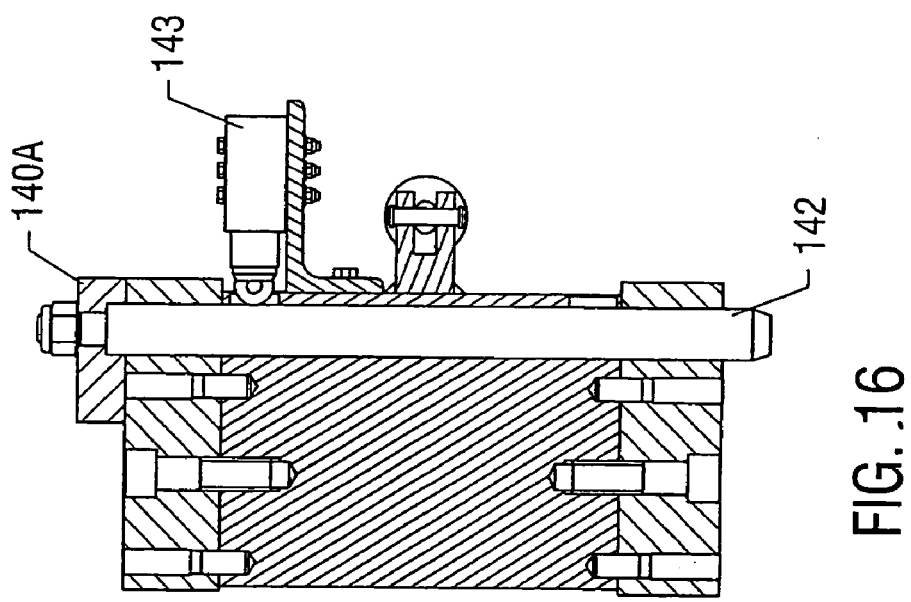
FIG. 16 is a cross-section of the latch cylinder guide rod.

FIG. 16 shows a cross-section of the latch cylinder guide rod 142 in position and engaging positioning switch 143. Latch cylinder guide rod 142 is connected to latch cylinder 144 and latch pin 140 via latch pin plate 140A. Guide rod 142 serves as a guide to help align latch pin 140 with hollow cylinder 120A when the latch pin is moved from the unlatch to the latched positions by latched cylinder 144. Guide rod 142 is longer than latch pin 140 and thus will enter into its mating receptacle prior to the entry of latch pin 140 into hollow cylinder 120A when moving from the unlatched to latched position. The tapered end of guide rod 142 facilitates entry into its receptacle.

Figure 17:
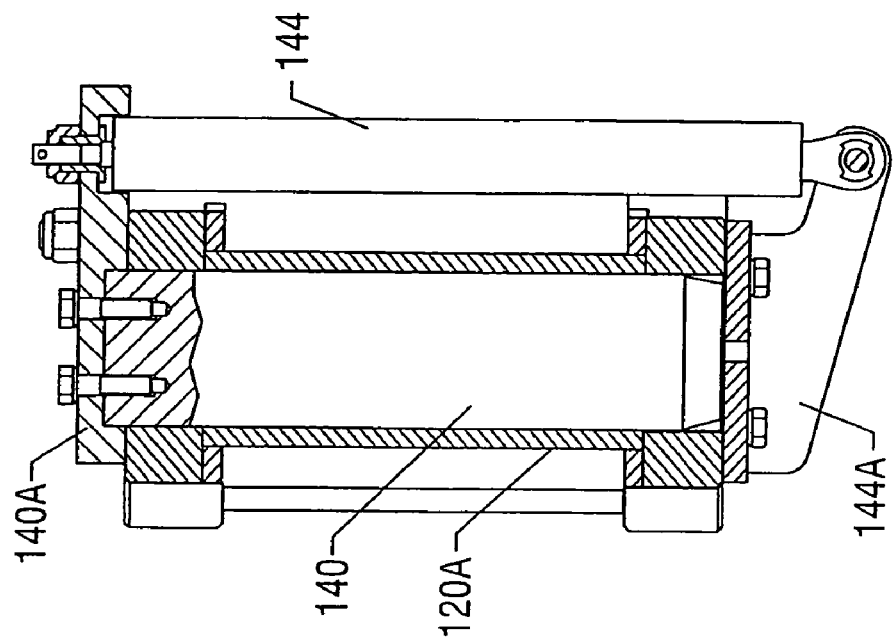
FIG. 17 is a cross-section of the latch pin and latch cylinder.

FIG. 17 depicts a cross-section of the latch pin 140 in position with the latch cylinder 144 in the retracted position. Latch cylinder 144 may be hydraulically stroked to lift latch pin 140 out of hollow cylinder 120A to release outer latch 130 from inner latch 120. Latch cylinder 144 is connected at its upper end to latch pin plate 140A and secured at its lower end to outer latch 130 by bracket 144A.

Figure 19:
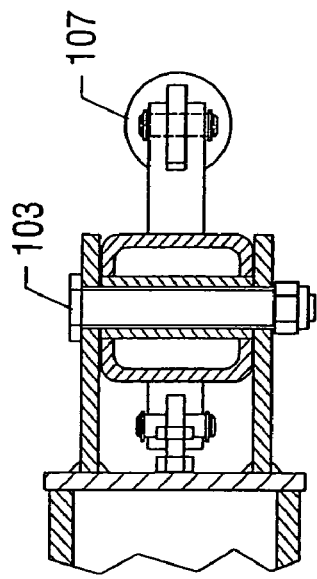
FIG. 19 is a side view of the inner latch arm pivot.
Figure 20:
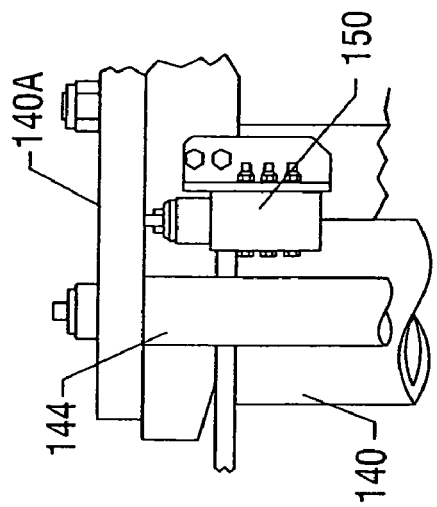
FIG. 20 is a cross-section of the installed latch pin.
Figure 18:
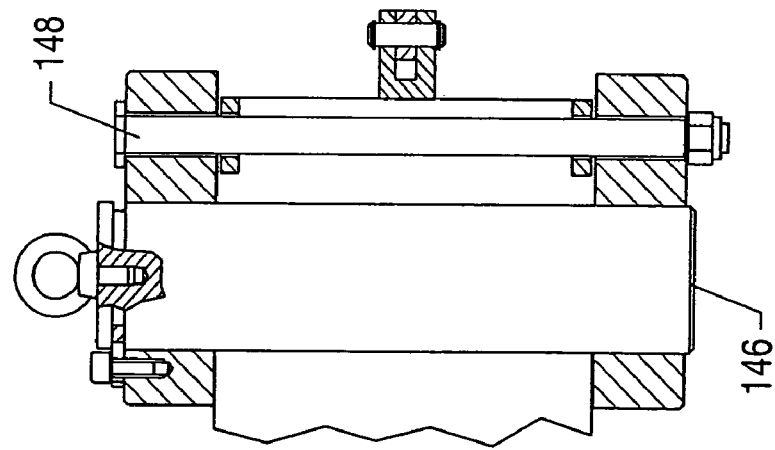
FIG. 18 is a cross-section of the outer latch strap pin.

FIG. 18 shows the detail of the outer latch strap pin 146 and the outer latch arm pin 148. Outer latch 130 pivots about pin 148. FIG. 19 is a view of the inner latch arm from the side and shows an arm pin 103 and the attachment point of the inner latch hydraulic cylinder 107. FIG. 20 shows an installed latch pin 140 and latch pin plate 140A engaging switch 150. For clarity purposes, hydraulic control lines for the embodiment is illustrated in FIGS. 7–20 are not shown. However, the configuration and use of hydraulic controls and the supporting lines are well known to one of skill in the art of automated rig floor equipment. One of skill will also recognize that such hydraulic controls will allow the operation of the conductor torquing apparatus from a remote location on the rig floor. One of skill in the art will also recognize that the latching mechanism illustrated in FIGS. 10 and 14–20 may also be used with the chain vise disclosed above.

In the preferred embodiment, the conductor torquing apparatus of the present invention is hydraulically operated. However, one of skill will appreciate that the apparatus may also be operated pneumatically, electrically or by a combination of such systems.

The present invention also includes the methods of making-up threaded tubulars using the previously described embodiments of the torquing apparatus. According to a preferred method, a first joint of conductor casing is run into the wellbore and landed in the rotary table. A new joint of conductor casing is picked up and moved in from the rig's V-door. The second joint is positioned above and stabbed into the box member of the joint of conductor casing suspended in the rotary table by using the rig's air tuggers or by using an automated system. The conductor torquing apparatus 10 is moved horizontally into engagement with the two joints of conductor casing, preferably by use of the hydraulic arm of the BJ Tubular Services' Leadhand II system. The lower chain vise 20 is closed about the lower casing conductor joint extending from the rotary table. Lower chain tensioner cylinder 60 is actuated (i.e., retracted) to tension chain 22 thereby locking the lower chain vise to conductor casing 2. Die blocks 31 may be included in support plate 26 to provide an additional gripping force on conductor casing 2 to keep the casing from rotating during make-up of threaded connector 3. Arms 50 are moved about the upper joint of conductor casing, telescoping the arms outwardly if necessary as shown in FIG. 2. Arms 50 are closed about the conductor casing and retracted until the upper joint of conductor casing is pressed firmly against drive wheels 68. The drive wheels are rotated by drive unit 70 to rapidly rotate the upper joint of conductor casing at a low torque to make-up threaded connector 3 to an initial make-up position. Arms 50 apply sufficient horizontal force to ensure that the drive rollers are fully engaged on the upper joint of conductor casing, and thereby have enough frictional force to rotate the joint.

Once the initial make-up torque is applied, the upper chain vise is actuated to grip casing conductor 1 by applying tension to chain 32 by upper chain tensioner cylinder 60. Thereafter, wrenching cylinder 35 is actuated (i.e., retracted) to apply rotational force to the upper chain vise thereby causing the upper joint to rotate the final make-up distance (e.g., about 1–3 radial inches) until the final make-up torque is applied to connector 3.

To release the conductor torquing apparatus, the tension is released from chain 32 by extending the upper chain tensioner cylinder 60. Drive cylinder 65 is contracted thereby causing arms 50 to pivot about pivot pins 58 and move to the open position as shown in FIG. 2. Lower chain tensioner cylinders 60 is also extended to relieve the tension on chain 22, after which chains 32 and 22 may be unlocked and apparatus 10 can be pulled back away from the conductor casing.

The present invention additionally includes the methods of making-up threaded tubulars using the previously described grip head embodiments of the torquing apparatus. According to a preferred method, a first joint of conductor casing is run into the wellbore and landed in the rotary table. A new joint of conductor casing is picked up and moved in from the rig's V-door. The second joint is positioned above and stabbed into the box member of the joint of conductor casing suspended in the rotary table by using the rig's air tuggers or by using an automated system. The conductor torquing apparatus 10 is moved horizontally into engagement with the two joints of conductor casing, preferably by use of a hydraulic arm such as the BJ Tubular Services' Leadhand II system. The fixed grip head 100 is closed about the lower casing conductor joint extending from the rotary table. First, the inner latch arm will be rotated toward the casing until the inner latch touches the casing. Next, the outer latch arm will swing around until it touches the casing and the other latch contacts the inner latch, with cylinders 107 and 108 providing the final movement into the latched position. An indicating switch 150 will indicate that the connection has been properly made, and latch pin 140 will be hydraulically driven into position by latch cylinder 144 to hold the inner and outer latch together and against the casing. After switch 150 indicates that the latch pin 140 is in place, lower strap tensioner cylinder 60 is actuated (i.e., retracted) to tension the straps 110, 111 thereby locking the fixed grip head 100 to conductor casing 2. Die blocks 31 may be included in support plate 26 to provide an additional gripping force on conductor casing 2 to keep the casing from rotating during make-up of threaded connector 3.

Arms 50 are moved about the upper joint of conductor casing, telescoping the arms outwardly if necessary as shown in FIG. 12. Arms 50 are closed about the conductor casing and retracted until the upper joint of conductor casing is pressed firmly against drive wheels 68. The drive wheels are rotated by drive unit 70 to rotate the upper joint of conductor casing at a low torque to make-up threaded connector 3 to an initial make-up position. Arms 50 apply sufficient horizontal force to ensure that the drive rollers are fully engaged on the upper joint of conductor casing, and thereby have enough frictional force to rotate the joint.

Once the initial make-up torque is applied, the rotary grip head is closed about and actuated to grip casing conductor 1 by applying tension to straps 210, 211 with upper strap tensioner cylinder 160. Thereafter, wrenching cylinder 35 is actuated (i.e., retracted) to apply rotational force to the rotary grip head thereby causing the upper joint to rotate the final make-up distance (e.g., about 1–3 radial inches) until the final make-up torque is applied to connector 3.

Figure 7:
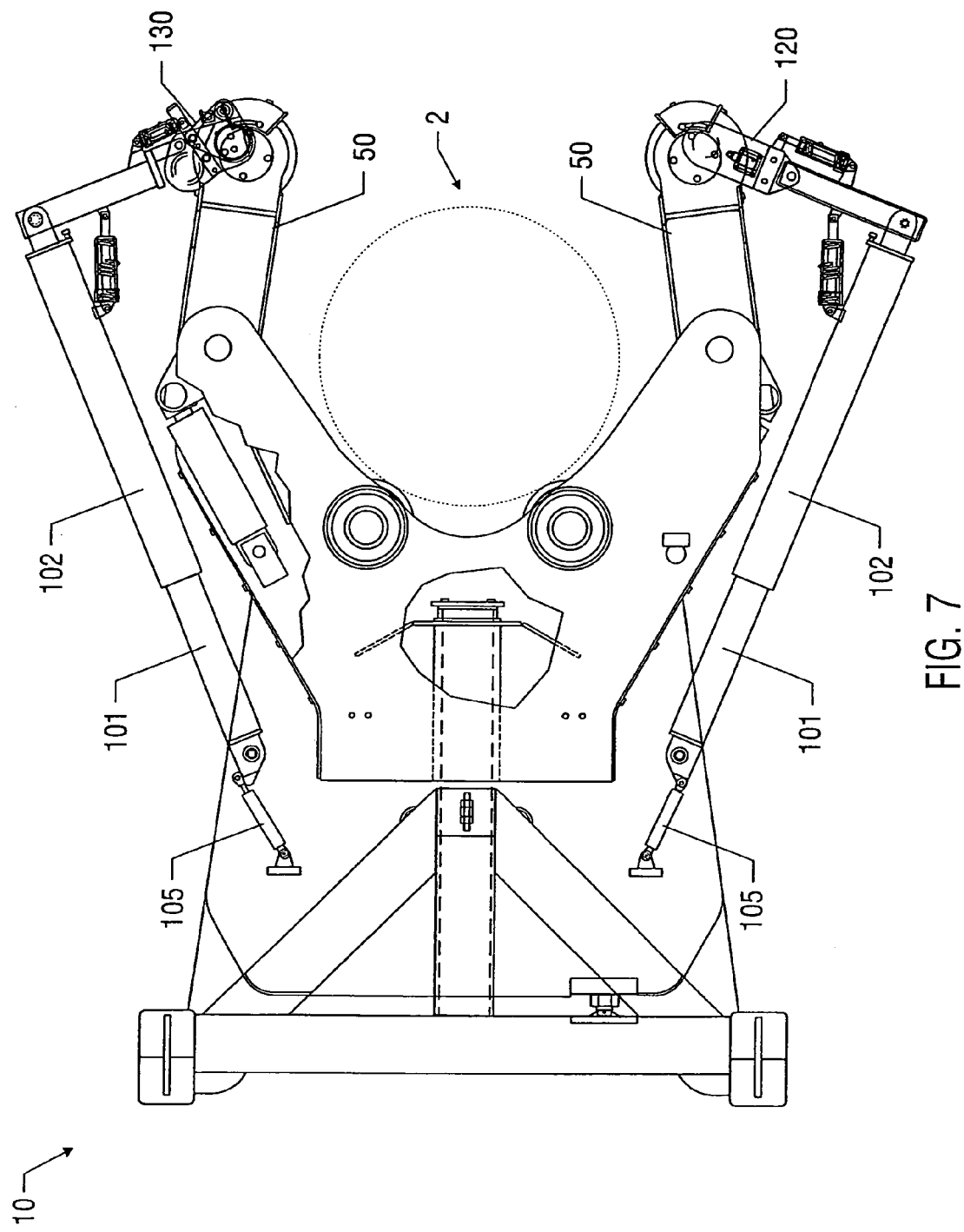
FIG. 7 is an overhead view of the conductor torquing apparatus according to one embodiment of the present invention.

To release the conductor torquing apparatus, the tension is released from straps 210, 211 by extending the upper strap tensioner cylinder 160. Latch pin 240 is removed by stroking latch cylinder 244 to its extended position (not shown). Switch 243 indicates that the latch pin 240 has been removed, causing the outer latch arm 230 and the inner latch arm 220 to swing open via the spring tension cylinder 206. Drive cylinder 65 is contracted thereby causing arms 50 to pivot about pivot pins 58 and move to the open position as shown in FIG. 7. Lower strap tensioner cylinder 60 is also extended to relieve the tension on straps 110, 111, after which the latch pin 140 may be removed by hydraulically extending latch cylinder 144. Switch 143 indicates that the latch pin is fully retracted, causing the outer latch arm 130 and inner latch arm 120 to swing open via the spring tension cylinder 106. Hydraulic cylinders 105 are retracted to pivot the outer arms open and apparatus 10 can be pulled back away from the conductor casing.

One of skill in the art will realize that the above operations with the conductor torquing apparatus, including the rotary 200 and fixed grip 100 heads may be accomplished using a remote control console for hydraulic, pneumatic, and/or electric control.

Although the above description has been directed to the make-up of a threaded conductor casing connection, one of skill will appreciate that conductor torquing apparatus 10 can be used to break-out a connection by reversing the operation of the tool. More particularly, wrenching cylinder 35 may be actuated (i.e. extended) to cause upper chain vise 30, or rotary grip head 200, to apply a counterclockwise rotation to the upper conductor casing joint to break-out the connection. Drive wheels 68 may be rotated in the opposite direction to unscrew the pin member on upper connector casing joint 1 from the box member of lower conductor casing joint 2.

Figure 6:
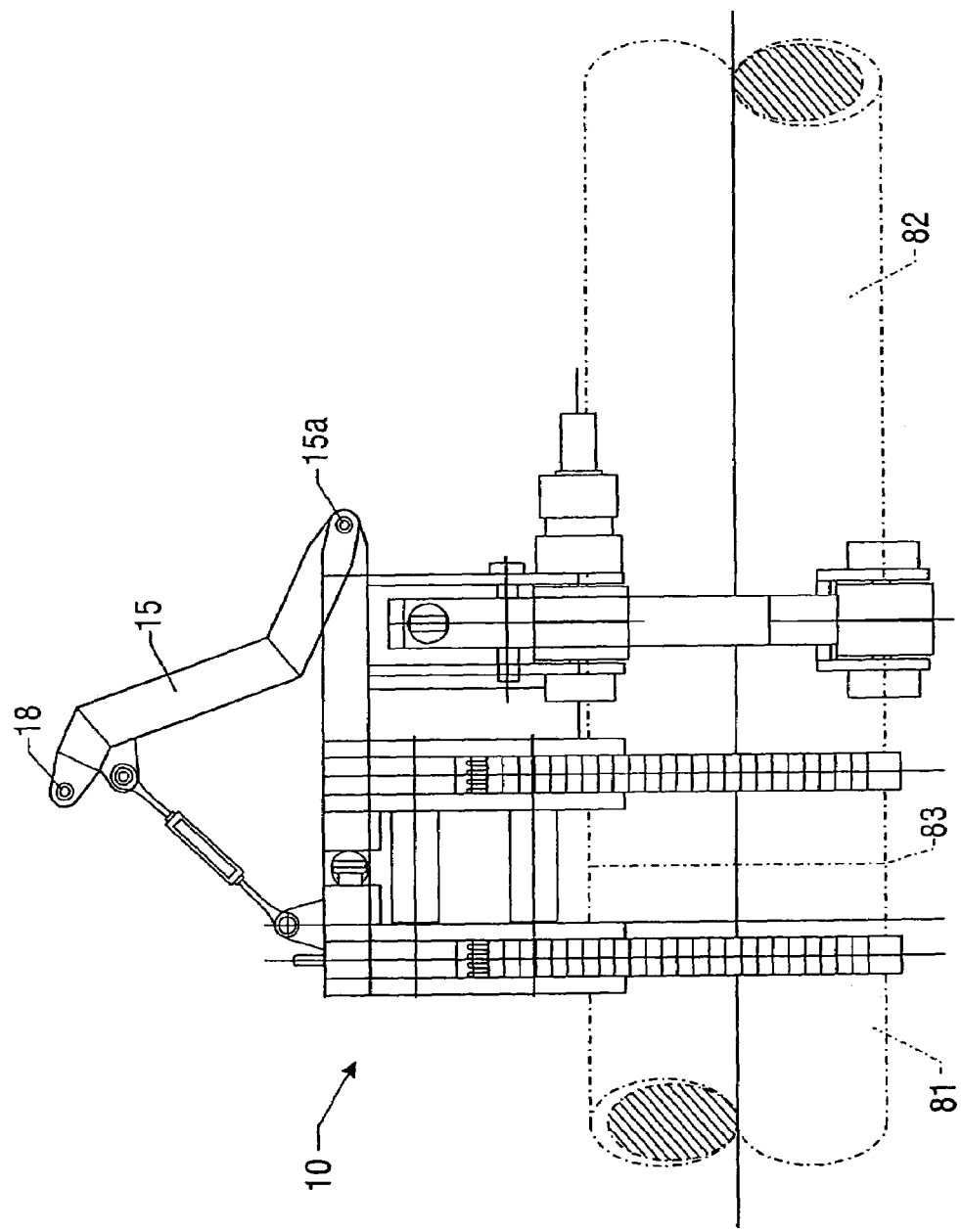
FIG. 6 is a side view of an embodiment of the invention in horizontal operation on a large diameter threaded tubular.

The torquing apparatus could also be used in making up or breaking out horizontal pipe, such as laying pipelines which have threaded connectors. FIG. 6 illustrates apparatus 10 rigged for use for horizontal operation. Frame 15 is folded at joint 15a and secured by any suitable means as shown in FIG. 6 so that torquing apparatus 10 can make-up threaded connector 83 for joints 81 and 82 in essentially the same manner as described for making-up conductor casing.

While the apparatus, compositions and methods of this invention have been described in terms of preferred or illustrative embodiments, it will be apparent to those of skill in the art that variations may be applied to the process described herein without departing from the concept and scope of the invention. For example, in another embodiment of the invention, drive wheels could be positioned on the distal end of arms 50, in place of retaining wheels 55. A separate drive unit would be associated with each drive wheel. In an additional embodiment, the chains as a gripping means may be replaced with webbing as shown in FIG. 12. The webbing straps 110,111 may be joined together after being placed around the casing in a manner similar to the chain vise grip as discussed above. One of skill in the art will realize that any method of securing the straps to together so that they can withstand up to 150,000 ft lbs. of torque may be used. All such similar substitutes and modifications apparent to those skilled in the art are deemed to be within the scope and concept of the invention as it is set out in the following claims.

What is claimed is:

1. An apparatus for making up large diameter conductor casing having threaded connections comprising:
    a fixed grip head comprising a pair of straps adapted to grip a first joint of conductor casing to prevent rotation thereof, wherein one end of the straps are connectable by a latching mechanism, and the other end of at least one of the straps is attached to a strap tensioner operable to tension the straps, and
    a plurality of movable arms operable to apply a retaining force to a second joint of conductor casing to maintain the second joint of conductor casing in rotational contact with one or more drive wheels on a spinner means,
    the spinner means operable to rotationally make-up a threaded connection connecting the second joint of conductor casing to the first joint of conductor casing to an initial make-up torque, and
    a rotary grip head comprising a pair of straps adapted to grip the second joint of conductor casing and operable to apply a final make-up torque to the threaded connection connecting the second joint of conductor casing to the first joint of conductor casing, wherein one end of the straps are connectable by a latching mechanism and the other end of at least one of the straps is attached to a strap tensioner operable to tension the straps.

2. The apparatus of claim 1 further comprising a pair of support arms on the fixed grip head.

3. The apparatus of claim 2 wherein the lengths of the fixed grip head arms may be telescopically extended to close about the first joint of conductor casing.

4. The apparatus of claim 2 further comprising a pivotable inner latch arm for supporting an inner strap and an inner latch, and a pivotable outer latch arm for supporting an outer strap and an outer latch, wherein both latch arms are movable between a first position where the inner and outer latches may be latched together engaging the inner and outer straps to the casing, and a second position wherein the inner and outer straps and the inner and outer latches are released from the second joint of conductor casing.

5. The apparatus of claim 1 further comprising a pair of support arms on the rotary grip head.

6. The apparatus of claim 5 wherein the lengths of the rotary grip head arms may be telescopically extended to close about the second joint of conductor casing.

7. The apparatus of claim 5, further comprising a pivotable inner latch arm for supporting an inner strap and an inner latch, and a pivotable outer latch arm for supporting an outer strap and an outer latch, wherein both latch arms are movable between a first position where the inner and outer latches may be latched together engaging the inner and outer straps to the casing, and a second position wherein the inner and outer straps and the inner and outer latches are released from the first joint of conductor casing.

8. The apparatus of claim 1 wherein one strap on the fixed grip head is anchored to the apparatus and one strap on the rotary grip head is anchored to the apparatus.

9. The apparatus of claim 1 further comprising a second strap tensioner on the fixed grip head, wherein one end of each strap on the fixed grip head is attached to a strap tensioner.

10. The apparatus of claim 9 wherein one of the strap tensioners is adjustable to accommodate a range of conductor casing diameters.

11. The apparatus of claim 10 wherein one of the strap tensioners is a hand adjustment cylinder.

12. The apparatus of claim 1 further comprising a second strap tensioner on the rotary grip head, wherein one end of each strap on the rotary grip head is attached to a strap tensioner.

13. The apparatus of claim 12 wherein one of the strap tensioners is adjustable to accommodate a range of conductor casing diameters.

14. The apparatus of claim 13 wherein one of the strap tensioners is a hand adjustment cylinder.

15. The apparatus of claim 1 further comprising a retaining roller attached to the distal end of each retaining arm.

16. The apparatus of claim 1 wherein the rotary and fixed grip heads are adapted to grip conductor casings ranging from 16 inches to 48 inches in diameter.

17. The apparatus of claim 1 wherein the strap tensioners for the rotary and fixed grip heads each comprise a hydraulic cylinder.

18. The apparatus of claim 1 further comprising a drive cylinder for moving the movable arms.

19. The apparatus of claim 18 wherein the drive cylinder for the movable retaining arms is hydraulically actuated.

20. The apparatus of claim 1 further comprising a remote control console for operating the movable arms, strap tensioner, and spinner means.

21. The apparatus of claim 20 wherein the remote control console is hydraulically actuated.

22. The apparatus of claim 1 wherein the latch mechanism can be remotely opened or closed.

23. The apparatus of claim 1 further comprising a wrenching cylinder connecting the rotary and fixed grip heads wherein operation of the wrenching cylinder transmits the final make-up torque to the rotary grip head.

24. The apparatus of claim 23 wherein the wrenching cylinder is hydraulically actuated.

25. The apparatus of claim 23 wherein the final make-up torque ranges from the initial make-up torque valve to about 150,000 foot pounds.

26. The apparatus of claim 1 wherein the drive wheels are hydraulically actuated.

27. The apparatus of claim 1 further comprising a support frame for supporting the rotary and fixed grip heads, the movable arms and the spinner means.

28. The apparatus of claim 1 wherein the rotary grip head further comprises one or more die blocks for gripping the second joint of casing.

29. The apparatus of claim 1 wherein the fixed grip head further comprises one or more die blocks for gripping the first joint of casing.

30. An apparatus for making up jointed pipe with threaded connections comprising:
a means for gripping a first joint of pipe to prevent rotation thereof,
a spinner means having one or more drive wheels operable to rotationally make-up a threaded connection between a second joint of pipe and the first joint of pipe to an initial make-up torque,
a means for applying a retaining force to the second joint of pipe to maintain the second joint of pipe in rotational contact with the drive wheels of the spinner means, and
a second means for gripping the second joint of pipe and operable to apply a final make-up torque to the threaded connection;
wherein the means for gripping the first and second joints of pipe may be telescopically extended to close about the pipe.

31. The apparatus of claim 30 wherein the means for gripping the second joint of pipe includes a pair of straps for gripping the pipe.

32. The apparatus of claim 31 wherein one end of each of the straps is attached to a strap tensioner cylinder, operable to tension the straps.

33. The apparatus of claim 32 wherein the other end of each strap is attached to a latching mechanism.

34. The apparatus of claim 31 further comprising a pivotable inner latch arm for supporting an inner strap and inner latch, and a pivotable outer latch arm for supporting an outer strap and outer latch, wherein both latch arms are movable between a first position where the inner and outer latches may be latched together engaging the inner and outer straps to the casing, and a second position wherein the inner and outer straps and the inner and outer latches are released from the second joint of pipe.

35. The apparatus of claim 30 wherein the means for gripping the first joint of pipe includes a pair of straps for gripping the pipe.

36. The apparatus of claim 35 wherein one end of each of the straps is attached to a strap tensioner cylinder, operable to tension the straps.

37. The apparatus of claim 36 wherein the other end of each strap is attached to a latching mechanism.

38. The apparatus of claim 30 wherein the means for gripping the first and second joints of pipe further incorporates one or more die blocks for gripping the pipe.

39. The apparatus of claim 35 further comprising a pivotable inner latch arm for supporting the inner strap and inner latch, and a pivotable outer latch arm for supporting the outer strap and outer latch, wherein both latch arms are movable between a first position where the inner and outer latches may be latched together engaging the inner and outer straps to the casing, and a second position wherein the inner and outer straps and the inner and outer latches are released from the first joint of pipe.

40. The apparatus of claim 30 further comprising a wrenching cylinder connecting the means for gripping the first and second joints of pipe wherein operation of the wrenching cylinder transmits the final make-up torque to the threaded connection.

41. The apparatus of claim 30 further comprising a support frame for supporting the means for gripping the first and second joints and the spinner means.

42. The apparatus of claims 30 or 35 wherein the straps are high tensile webbing straps capable of applying a torque of up to about 150,000 foot-pounds.

43. A method for making up jointed pipe having threaded connections comprising:
gripping a first joint of pipe with a first gripping means to prevent rotation thereof,
applying a retaining force to a second joint of pipe to maintain the second joint of pipe in contact with one or more drive wheels on a spinner means,
making up a threaded connection connecting the second joint of pipe to the first joint of pipe to an initial make-up torque with the spinner means, and
applying a final make-up torque to the threaded connection connecting the second joint of pipe to the first joint of pipe with a second gripping means, wherein the first and second gripping means and the spinner means are components of a single apparatus, and wherein the first and second gripping means may be telescopically extended to close about the pipe.

44. The method of claim 43 wherein the first gripping means comprises a pair of straps that are releasably connected by a latching mechanism to grip the first joint of pipe.

45. The method of claim 44 wherein the second gripping means comprises a pair of straps that are releasably connected by a latching mechanism to grip the second joint of pipe.

46. The method of claim 45 further comprising providing a pair of support arms for the first gripping means and a pair of support arms for the second gripping means.

47. The method of claim 44 wherein the step of gripping a first joint of pipe further comprises hydraulically actuating a strap tensioner cylinder to tension the pair of straps.

48. The method of claim 44 further comprising tensioning the pair of straps to grip the second joint of pipe by hydraulically actuating a strap tensioner cylinder.

49. The method of claim 43 wherein the step of applying a final make-up torque further comprises actuating a wrenching cylinder connected to the first gripping means to transmit the final make-up torque to the threaded connection.

50. The method of claim 49 further comprising hydraulically actuating the wrenching cylinder.

51. The method of claim 49 further comprising applying a final make-up torque of up to 150,000 ft. pounds to the connection.

52. The method of claim 43 further comprising hydraulically actuating the one or more drive wheels on the spinner means to make up the threaded connection to the initial make-up torque.

53. The method of claim 43 further comprising operating the components from a remote control console.

54. An apparatus for making up jointed pipe with thread connections comprising:
- a pair of gripping members for gripping a joint of pipe;
- a remotely operated latching mechanism for connecting the gripping members, the latching mechanism comprising:
  - an inner latch,
  - an outer latch, and
  - a latch pin selectively moveable between an open position and a closed position,
    - wherein in the closed position the pin secures the inner and outer latches together.

55. The apparatus of claim 54 further comprising a latch cylinder operable to move the latch pin between the open and closed positions.

56. The apparatus of claim 55 further comprising a latch cylinder guide rod operable to guide the latch pin into a mating receptacle when the latch pin is moved to a closed position.

57. The apparatus of claim 54 further comprising a switch which indicates when the inner and outer latches are aligned and together so the latch pin may be moved to the closed position.

58. The apparatus of claim 54 wherein the gripping members are webbed straps.

59. The apparatus of claim 54 further comprising a hydraulic cylinder attached to the end of one of the gripping members, the hydraulic cylinder operable to tension the gripping members when the inner and outer latches are latched together.

60. The apparatus of claim 54 wherein the apparatus is hydraulically operated from a remote control console.

61. A method for making up jointed conductor pipe having threaded connections comprising:
- providing an apparatus having a spinner means, a fixed grip head and a rotary grip head;
- stabbing a pin end of a first joint of conductor pipe into a box end of a second joint of conductor pipe;
- closing arms on the spinner means about the first joint of pipe to align the apparatus about the conductor pipe;
- latching a pair of gripping members of the fixed grip head together about the second joint of pipe;
- tensioning the gripping members of the fixed grip head to prevent rotation of the second joint of pipe;
- making up the threaded connection by rotating the first joint of pipe with the spinner means to an initial make up torque;
- latching a pair of gripping members of the rotary grip head about the first joint of pipe; and
- tensioning the gripping members of the rotary grip head and applying a final make-up torque to the threaded connection.

* * * * *